(12) United States Patent
Kwon et al.

(10) Patent No.: US 8,943,249 B2
(45) Date of Patent: Jan. 27, 2015

(54) SYSTEM ON CHIP IMPROVING DATA TRAFFIC AND OPERATING METHOD THEREOF

(75) Inventors: Woo Cheol Kwon, Suwon-si (KR); Jae Geun Yun, Hwaseong-si (KR); Bub-Chul Jeong, Yongin-si (KR); Jun Hyung Um, Seoul (KR); Hyun-Joon Kang, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 344 days.

(21) Appl. No.: 13/427,096

(22) Filed: Mar. 22, 2012

(65) Prior Publication Data

US 2012/0246368 A1 Sep. 27, 2012

(30) Foreign Application Priority Data

Mar. 24, 2011 (KR) ........................ 10-2011-0026443

(51) Int. Cl.
G06F 13/00 (2006.01)
G06F 13/362 (2006.01)
G06F 13/40 (2006.01)

(52) U.S. Cl.
CPC ........ *G06F 13/3625* (2013.01); *G06F 13/4022* (2013.01)
USPC .............. 710/110; 710/29; 710/316; 710/317

(58) Field of Classification Search
CPC ............................................. H04L 47/10–47/41
USPC .................................. 710/29, 110, 316–317
See application file for complete search history.

(56) References Cited

U.S. PATENT DOCUMENTS

| | | | |
|---|---|---|---|
| 6,839,767 B1 | 1/2005 | Davies et al. | |
| 7,769,936 B2 * | 8/2010 | Mace | 710/113 |
| 8,307,138 B2 * | 11/2012 | Mace et al. | 710/110 |
| 8,316,171 B2 * | 11/2012 | Boucard et al. | 710/241 |
| 8,549,199 B2 * | 10/2013 | Mace | 710/244 |
| 8,649,286 B2 * | 2/2014 | Saund et al. | 370/252 |
| 8,762,616 B2 * | 6/2014 | Mitsubayashi | 710/306 |
| 2003/0225905 A1 | 12/2003 | Scifres et al. | |
| 2005/0071471 A1 | 3/2005 | Saenz, III | |
| 2005/0086338 A1 | 4/2005 | Krishnan | |
| 2012/0159037 A1 * | 6/2012 | Kwon et al. | 710/317 |
| 2013/0268706 A1 * | 10/2013 | Yun et al. | 710/110 |

* cited by examiner

*Primary Examiner* — Brian Misiura
(74) *Attorney, Agent, or Firm* — F. Chau & Associates, LLC

(57) ABSTRACT

A system on chip (SoC) includes a first master, a slave, a bus switch transmitting a first command of the master and a first response of the slave, and a first priority controller connected between the first master and the bus switch The first priority controller measures at least one of first bandwidth and first latency based on the first command and the first response and adjusts the priority of the first command according to at least one of the measurement results.

19 Claims, 25 Drawing Sheets

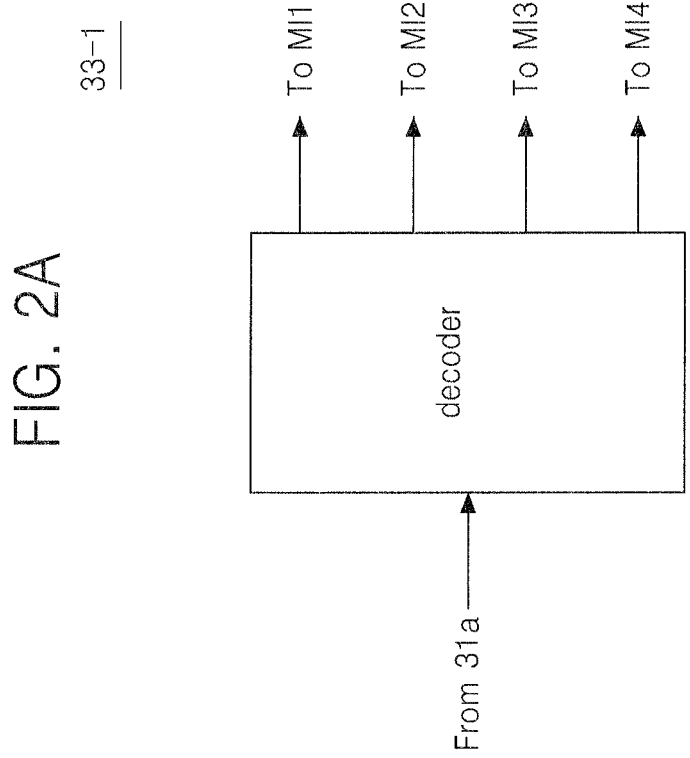

SYSTEM ON CHIP IMPROVING DATA TRAFFIC AND OPERATING METHOD THEREOF

CROSS-REFERENCE TO RELATED APPLICATIONS

This application claims priority under 35 U.S.C. §119(a) to Korean Patent Application No. 10-2011-0026443 filed on Mar. 24, 2011, the entire contents of which are hereby incorporated by reference.

TECHNICAL FIELD

Embodiments of the present inventive concept relate to a system on chip (SoC), and more particularly, to a SoC for a communication network that improves data traffic of a plurality of masters on the network and an operating method thereof.

DISCUSSION OF THE RELATED ART

A communication network requires various levels of Quality of Service (QoS). In the field of computer networking and other packet-switched telecommunication networks, the term QoS refers to resource reservation control mechanisms rather than the achieved service quality. Quality of service is the ability to provide different priority to different applications, users, or data flows, or to guarantee a certain level of performance to a data flow. For example, a required bit rate, delay, jitter, packet dropping probability and/or bit error rate may be guaranteed. Quality of service guarantees are important if the network capacity is insufficient, especially in networks where the capacity is a limited resource.

The data source transmitted through a communication network requires allocation of minimum bandwidth or requires data transmission to be completed according to characteristics of data and having a determined latency. Accordingly, when one master generates a data source inducing excessive traffic, QoS of a whole system may be lowered.

SUMMARY

A communication network may be implemented within a system on chip (SoC). An embodiment of the present invention provides a System on Chip (SoC), including a first master, a slave, a bus switch transmitting a first command of the first master and a first response of the first slave, and a first priority controller connected between the first master and the bus switch. The first priority controller measures at least one of first bandwidth and first latency based on the first command and the first response and adjusts the first priority of the first command according to at least one of the measurement results.

The SoC further includes a second master, which transmits a second command to the slave through the bus switch and receives a second response to the second command from the slave, and a second priority controller connected between the second master and the bus switch. The second priority controller measures at least one of second bandwidth and second latency based on the second command and the second response and adjusts the second priority of the second command according to at least one of the measurement results.

According to an exemplary embodiment, the first priority controller includes a bandwidth monitor measuring the first bandwidth and a priority generator adjusting the first priority by comparing the first bandwidth measured by the bandwidth monitor with a bandwidth reference value.

According to another exemplary embodiment, the first priority controller includes a latency monitor measuring the first latency and a priority generator adjusting the first priority by comparing the first latency measured by the latency monitor with a latency reference value.

The first priority controller decreases the first priority when the measured first bandwidth is higher than the bandwidth reference value. The first priority controller decreases the first priority when the measured first latency is higher than the latency reference value.

The first priority controller further includes a reset period controller setting the first priority as a default value at every reset time period.

The bus switch includes a first slave-interface connected to the first master through the first priority controller, a second slave-interface connected to the second master, a master-interface connected to the slave. Each of the first slave-interface and the second slave-interface is connected to the master-interface, and the master-interface compares the first priority with the second priority and transmits one of the first command and the second command to the slave according to the comparison result.

According to an exemplary embodiment, the second priority controller includes a bandwidth monitor measuring the second bandwidth and a priority generator adjusting the second priority by comparing the second bandwidth measured by the bandwidth monitor with a bandwidth reference value. The second priority controller decreases the second priority when the measured second bandwidth is higher than the bandwidth reference value.

According to another exemplary embodiment, the second priority controller includes a latency monitor measuring the second latency and a priority generator adjusting the second priority by comparing the second latency measured by the latency monitor with a latency reference value. The second priority controller decreases the second priority when the measured second latency is higher than the latency reference value.

Another exemplary embodiment of the present invention is directed to a SoC, including a master, a slave and a bus subsystem transmitting a command of the master and a response of the slave to the command. The bus subsystem measures a bandwidth from the command and the response and blocks transmission of the command according to the measurement result and an operation status value of the slave.

The bus subsystem includes a blocking controller blocking or releasing transmission of the command, a bus switch, which is connected between the blocking controller and the slave, transmits the command to the slave and transmits the response to the master, and a blocking monitor which is connected between the bus switch and the slave and transmits the operation status value to the blocking controller.

The blocking controller includes a bandwidth monitor measuring the bandwidth and a combination circuit, which blocks transmission of the command when the measured bandwidth is higher than a bandwidth reference value or blocks transmission of the command when the operation status value is higher than an operation status reference value.

When the operation status value is smaller than the operation status reference value after transmission of the command is blocked, the blocking controller transmits the blocked command.

The operation status value includes an outstanding count, and the outstanding count increases whenever the command is received and decreases whenever the response is transmitted.

Still another exemplary embodiment of the present invention is directed to a SoC, including a slave and a first master which transmits a first command to the slave and receives a first response of the slave to the first command through a first channel including a first priority controller and a bus switch. The first priority controller measures at least one of the bandwidth and the latency of the first channel based on the first command and the first response and adjusts a first priority of the first command according to at least one of the measurement results.

The SoC further includes a second master which transmits a second command to the slave and receives a second response of the slave to the second command through a second channel including the bus switch. The second channel further includes a second priority controller, and the second priority controller measures at least one of bandwidth and latency of the second channel based on the second command and the second response and adjusts a second priority of the second command according to at least one of the measurement results.

An exemplary embodiment of the present invention is directed to an operating method of SoC, including measuring at least one of first bandwidth and first latency according to a result of handshaking between a first master and a slave, which is performed through a first priority controller and through a bus switch, and adjusting the first priority of a command output from the first master according to at least one of the measurement results measured by the first priority controller.

The operating method of the SoC further includes measuring at least one of second bandwidth and second latency according to a result of handshaking between a second master and the slave, which is performed through a second priority controller and the bus switch, and adjusting the second priority of a command output from the second master according to at least one of the measurement results measured by the second priority controller.

The operating method of the SoC further includes decreasing the first priority when at least one of the measurement results is higher than a corresponding reference value. The operating method of the SoC further includes setting the first priority as a default value at every regular time (reset period).

Exemplary embodiments now will be described more fully hereinafter with reference to the accompanying drawings, in which exemplary embodiments are shown. Exemplary embodiments may, however, be embodied in many different forms and should not be construed as limited to the embodiments set forth herein. Rather, these exemplary embodiments are provided so that this disclosure will be thorough and complete, and will fully convey the scope of exemplary embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of exemplary embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The above and other features of exemplary embodiments will become more apparent by describing in detail exemplary embodiments thereof with reference to the attached drawings in which:

FIGS. 2A and 2B are block diagrams of the first slave-interface and the third slave-interface shown in FIG. 1;

DETAILED DESCRIPTION OF THE PREFERRED EMBODIMENTS

Regarding to a bus subsystem where a technical concept of the present invention is applied, AMBA AXI Protocol v3.0 Specification of http://www.arm.com is incorporated as a reference.

A System on Chip (SoC) according to an exemplary embodiment measures at least one of bandwidth and latency of a specific master and adjusts a priority to a command of the specific master according to at least a measurement result.

A first SoC 10a of the present inventive concept is explained in detail referring to FIGS. 1 to 10. A second SoC 10a of the present inventive concept is explained in detail referring to FIGS. 11 to 19.

Figure 1:
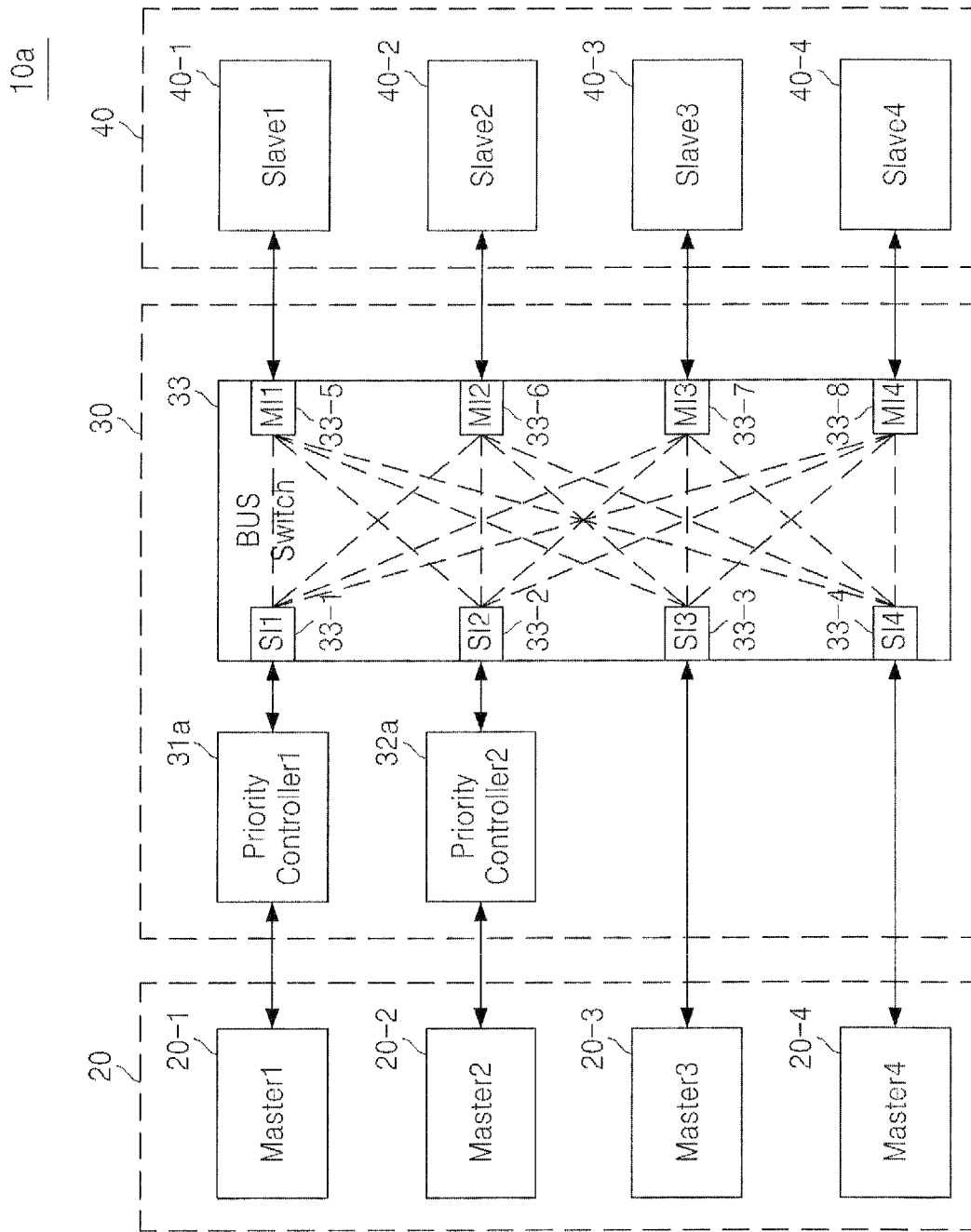
FIG. 1 is a block diagram of a System on Chip (SoC) according to a first exemplary embodiment.

FIG. 1 is a block diagram of a System on Chip (SoC) according to a first exemplary embodiment.

Referring to FIG. 1, the SoC 10a includes a plurality of masters 20, a bus subsystem 30 and a plurality of slaves 40.

In the present exemplary embodiment, the plurality of masters 20 includes a first master 20-1, a second master 20-2, a third master 20-3 and a fourth master 20-4. The plurality of slaves 40 includes a first slave 40-1, a second slave 40-2, a third slave 40-3 and a fourth slave 40-4. For convenience of explanation, the present inventive concept illustrates the SoC 10a including four masters and four slaves; however, it is not restricted thereto.

The bus subsystem 30 includes a first priority controller 31a, a second priority controller 32a and a bus switch 33. For convenience of explanation, FIG. 1 illustrates two priority controllers 31a and 32a; however, a priority controller may be allocated to each of the masters 20-1 to 20-4.

The bus switch 33 includes a first slave-interface 33-1, a second slave-interface 33-2, a third slave-interface 33-3, a fourth slave-interface 33-4, a first master-interface 33-5, a second master-interface 33-6, a third master-interface 33-7 and a fourth master-interface 33-8.

The first slave-interface 33-1 connects the first master 20-1, connected to the first priority controller 31a, with each one of the first slave 40-1, the second slave 40-2, the third slave 40-3 and the fourth slave 40-4. The second slave-interface 33-2 connects the second master 20-2, connected to the second priority controller 32a, with each one of the first slave 40-1, the second slave 40-2, the third slave 40-3 and the fourth slave 40-4.

The third slave-interface 33-3 connects the third master 20-3 with each one of the first slave 40-1, the second slave 40-2, the third slave 40-3 and the fourth slave 40-4. The fourth slave-interface 33-4 connects the fourth master 20-4 with each one of the first slave 40-1, the second slave 40-2, the third slave 40-3 and the fourth slave 40-4. The first slave-interface 33-1, the second slave-interface 33-2, the third slave-interface 33-3 and the fourth slave-interface 33-4 are explained in detail referring to FIGS. 2A and 2B.

The first master-interface 33-5 transmits a command of the first master 20-1, the second master 20-2, the third master 20-3 or of the fourth master 20-4 to the first slave 40-1 according to a priority (or a priority value). The second master-interface 33-6 transmits a command of the first master 20-1, the second master 20-2, the third master 20-3 or of the fourth master 20-4 to the second slave 40-2 according to a priority.

The third master-interface 33-7 transmits a command of the first master 20-1, the second master 20-2, the third master 20-3 or of the fourth master 20-4 to the third slave 40-3 according to a priority. The fourth master-interface 33-8 transmits a command of the first master 20-1, the second master 20-2, the third master 20-3 and the fourth master 20-4 to the fourth slave 40-4 according to a priority. The first master-interface 33-5, the second master-interface 33-6, the third master-interface 33-7 and the fourth master-interface 33-8 are explained in detail referring to FIG. 2C.

Each of the first master 20-1, the second master 20-2, the third master 20-3 and the fourth master 20-4 may be implemented as a microprocessor (CPU), a graphic processor (GPU) or an application specific intellectual property (IP) (ASIC) for designing a System on Chip (SoC).

The first priority controller 31a is connected between the first master 20-1 and the bus switch 33. The second priority controller 32a is connected between the second master 20-2 and the bus switch 33.

The amount of data traffic on the bus subsystem 30 is referred to as the occupancy rate. The occupancy rate of each channel may be calculated based on the ratio of data access cycles with respect to the total bus cycles in a predetermined time period.

While the occupancy rate of the bus subsystem 30 is high, each of the first master 20-1 and the second master 20-2, needs to reduce usage of the bus switch 33, and needs to be connected to each of the priority controller 31a and 32a. According to the present exemplary embodiment, it is assumed that network usage needs to be restricted in the first master 20-1 and/or the second master 20-2. Accordingly, each of the first priority controller 31a and the second priority controller 32a is connected to each of the first master 20-1 and the second master 20-2, respectively.

The first master 20-1 may access any one of the first slave 40-1, the second slave 40-2, the third slave 40-3 and the fourth slave 40-4 through the bus subsystem 30. Similarly, the second master 20-2 may access any one of the first slave 40-1, the second slave 40-2, the third slave 40-3 and the fourth slave 40-4 through the bus subsystem 30.

The priority of the first master 20-1 which is connected to the first priority controller 31a, and the priority of the second master 20-2 which is connected to the second priority controller 32a, may be adjusted. However, each priority of the third master 20-3 and the fourth master 20-4 being unconnected to a priority controller is fixed to a default value.

In an alternative embodiment, the first master 20-1 may be connected to the bus subsystem 30 by bypassing the first priority controller 31a.

Each of the first priority controller 31a and the second priority controller 32a is connected to each one of the first slave 40-1, the second slave 40-2, the third slave 40-3 and the fourth slave 40-4 through the bus subsystem 30. For example, the first priority controller 31a transmits a command output from the first master 20-1 to one of the first slave 40-1, the second slave 40-2, the third slave 40-3 and the fourth slave 40-4 through the bus subsystem 30. Here, each signal path where the command is transmitted to a slave may be called a channel.

When the first slave 40-1 receives a command output from the first master 20-1 through the first priority controller 31a and the bus switch 33, the first slave 40-1 transmits a response corresponding to the command to the first master 20-1 through the bus switch 33 and through the first priority controller 31a.

The first priority controller 31a measures at least one of bandwidth and latency corresponding to the command based on a command output from the first master 20-1 and a response transmitted from the first slave 40-1. Or the first priority controller 31a measures at least one of bandwidth and latency of the channel through which the command is transmitted based on a command output from the first master 20-1 and a response transmitted from the first slave 40-1. The first priority controller 31a adjusts priority for the command by using at least one of measured bandwidth and latency.

The first slave 40-1 processes one of the commands transmitted from the first master 20-1, the second master 20-2, the third master 20-3 and the fourth master 20-4 according to an adjusted priority. For example, when the priority of a command output from the first master 20-1 is the highest, the bus switch 33 transmits a command output from the first master 20-1 first to the first slave 40-1. How the bus switch 33 processes a command transmitted from each of the first master 20-1, the second master 20-2, the third master 20-3 and the fourth master 20-4 according to each priority will be explained in detail referring to FIGS. 2A to 2C.

The first priority controller 31a may enable the first master 20-1 to monopolize the bus subsystem 30 or make bandwidth of the first master 20-1 not higher than reference bandwidth by adjusting the priority of a command output from the first master 20-1. Each operation of the second priority controller 32a is substantially the same as an operation of the first priority controller 31a. An operation of the first priority controller 31a will be explained in detail referring to FIGS. 3 and 4.

Here, bandwidth means a data amount transmitted during unit time. Bit per second (bps) is used as a unit of the measured bandwidth. Thus, the bandwidth is measured as the number of bits of data transmitted in one second. Latency means the time interval between the time (or a time point) when a master outputs a command to a slave and the time (or a time point) when the slave responds to the command of the master. A method for measuring at least one of the bandwidth and the latency based on a command, output from a master, and a response, output from the slave, will be explained in detail referring to FIGS. 5 to 7.

The bus subsystem 30 supports a simultaneous access between a plurality of masters and a plurality of slaves. Specifically, the bus subsystem 30 may be implemented as an advanced microcontroller bus architecture (AMBA) 3 of ARM™ or Advanced eXtensible Interface (AXI) protocol (hereinafter: AXI protocol) of AMBA4.

The AXI protocol uses a read address channel AR-channel (hereinafter: AR-Channel) and a read data channel R-channel (hereinafter: R-Channel) for a read operation, and uses a write address channel AW-channel (hereinafter: AW-Channel), a write data channel W-channel (hereinafter: W-Channel) and a write response channel B-channel (hereinafter: B-Channel) for a write operation. Each channel is independent and does not affect each other.

In the AR-channel, a read address is transmitted from a master to a slave during a read operation. In the R-channel, data are transmitted from a slave to a master. In the AW-channel, a write address is transmitted from a master to a slave during a write operation. In the W-channel, data are transmitted from a master to a slave. In the B-channel, a completion response of a write operation is transmitted from a slave to a master. Each channel and a plurality of signals occurring between the channels are described in detail in tables 1 to 6.

A path from the first master 20-1 to the first slave 40-1 through the first priority controller 31a and the bus switch 33 is defined as a first channel. In addition, a path from the second master 20-2 to the first slave 40-1 through the second priority controller 32a and the bus switch 33 is defined as a second channel.

Each of the first slave 40-1, the second slave 40-2, the third slave 40-3 and the fourth slave 40-4 may be implemented as a memory controller, a static random access memory (SRAM) or Application-Specific Intellectual Property (IP) for designing a System on Chip (SoC).

For convenience of explanation, FIG. 1 illustrates four masters 20-1, 20-2, 20-3 and 20-4, two priority controllers 31a and 32a, the bus switch 33 and four slaves 40-1, 40-2, 40-3 and 40-4; however, the technical concept of the present invention is not restricted to the number of masters, the number of priority controllers and the number of slaves.

The SoC 10a may be implemented as in an integrated circuit formed on a semiconductor chip. The SoC 10a may also be embedded in a mobile phone, a smart phone, a tablet personal computer (PC) or a mobile communication device like a personal digital assistant (PDA). According to an exemplary embodiment, the SoC 10a may be embedded in an information technology (IT) device or a portable electronic device.

Figure 2B:
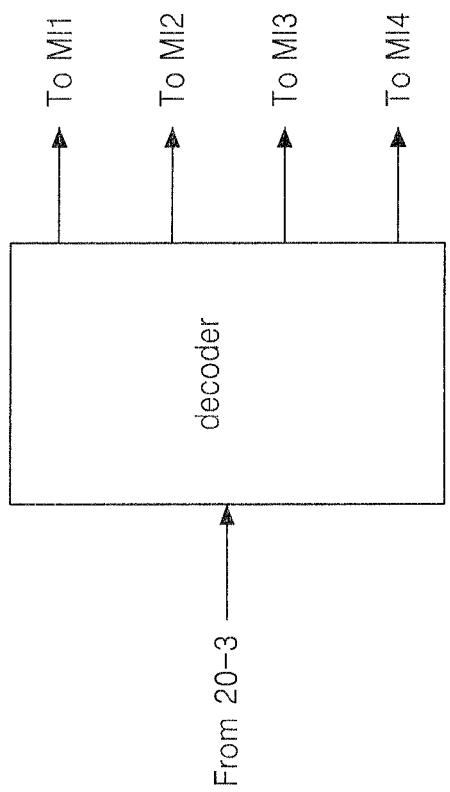

FIGS. 2A and 2B are block diagrams of the first slave-interface and the third slave-interface shown in FIG. 1. Referring to FIGS. 1 and 2A, the first slave-interface 33-1 may be implemented as a decoder. The first slave-interface 33-1 transmits a command, which is transmitted from the first master 20-1 connected through the first priority controller 31a, to one of the first master-interface 33-5, the second master-interface 33-6, the third master-interface 33-7 and the fourth master-interface 33-8 according to an address of the command. In addition, the second slave-interface 33-2 is embodied in the same configuration as the first slave-interface 33-1.

Referring to FIGS. 1 and 2B, the third slave-interface 33-3 may be implemented as a decoder. The third slave-interface 33-3 transmits a command, which is transmitted from the third master 20-3, to one of the first master-interface 33-5, the second master-interface 33-6, the third master-interface 33-7 and the fourth master-interface 33-8 according to an address of the command. In addition, the fourth slave-interface 33-4 is embodied in the same configuration as the third slave-interface 33-3.

Figure 2C:
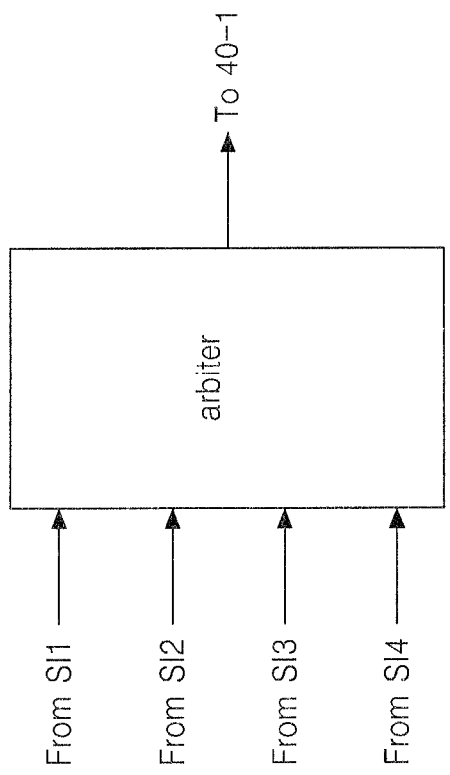
FIG. 2C is a block diagram of the first master-interface shown in FIG. 1.

FIG. 2C is a block diagram of the first master-interface shown in FIG. 1.

Referring to FIGS. 1 and 2C, a first master-interface 33-5 may be implemented as an arbiter. The first master-interface 33-5 transmits a command which has the highest priority among a plurality of input commands to the first slave 40-1. For example, the first master-interface 33-5 transmits a command, which has the highest priority among commands transmitted from the first slave-interface 33-1, the second slave-interface 33-2, the third slave-interface 33-3 and the fourth slave-interface 33-4, to the first slave 40-1. In addition, the second master-interface 33-6, the third master-interface 33-7 and the fourth master-interface 33-8 are embodied in the same configuration as the first master-interface 33-5.

Figure 3:
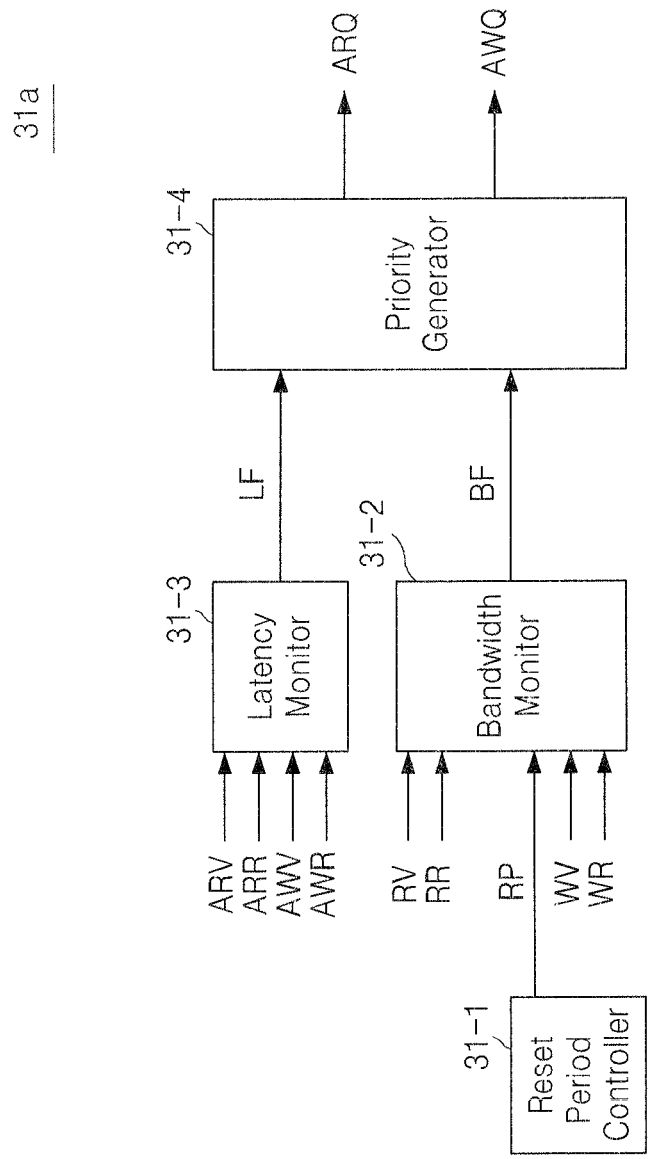
FIG. 3 is a block diagram of a first priority controller shown in FIG. 1.

FIG. 3 is a block diagram of a first priority controller shown in FIG. 1. Referring to FIGS. 1 and 3, a first priority controller 31a includes a reset period controller 31-1, a bandwidth monitor 31-2, a latency monitor 31-3 and a priority (value) generator 31-4.

The reset period controller 31-1 outputs a control signal RP for controlling a reset period of the bandwidth monitor 31-2. The bandwidth monitor 31-2 measures bandwidth by using a command output from the first master 20-1 and a response output from the first slave 40-1. A method for measuring bandwidth will be explained referring to FIG. 5. The bandwidth monitor 31-2 receives a read valid signal RV and a read ready signal RR to measure bandwidth during a read operation, and receives a write valid signal WV and a write ready signal WR to measure bandwidth during a write operation. Tables 1 and 2 refer to the said plurality of signals associated with the reset period controller 31-1.

Table 1 shows a plurality of signals used in the R-channel. Table 2 shows a plurality of signals used in the W-channel.

TABLE 1

| Signal | Source | Description |
| --- | --- | --- |
| RV | Slave | Read valid. |
| RR | Master | Read ready. |

TABLE 2

| Signal | Source | Description |
| --- | --- | --- |
| WV | Master | Write valid. |
| WR | Slave | Write ready. |

The latency monitor 31-3 receives a read address valid signal ARV and a read address ready signal ARR to measure latency during a read operation, and receives a write address valid signal AWV and a write address ready signal AWR to measure latency during a write operation. A method for measuring the latency will be explained referring to FIGS. 6 and 7.

Tables 3 and 4 refer to the said plurality of signals associated with the latency monitor 31-3. Table 3 shows a plurality of signals used in the AR-channel. Table 4 shows a plurality of signals used in the AW-channel.

TABLE 3

| Signal | Source | Description |
| --- | --- | --- |
| ARV | Master | Read address valid. |
| ARR | Slave | Read address ready. |

TABLE 4

| Signal | Source | Description |
| --- | --- | --- |
| AWV | Master | Write address valid. |
| AWR | Slave | Write address ready. |

The priority generator 31-4 receives bandwidth feedback or bandwidth information (BF) measured by the bandwidth monitor 31-2 and latency feedback or latency information (LF) measured by the latency monitor 31-3. The priority generator 31-4 generates a priority for a command requested by the first master 20-1 based on the bandwidth information BF and/or the latency information LF. The priority generator 31-4 generates a priority ARQ for a read command and a priority AWQ for a write command. For instance, when the priority ARQ or AWQ consists of four bits, the priority ARQ or AWQ is between 0 and 15.

The first master-interface 33-5 preferentially transmits a command which has the high priority to the first slave 40-1.

An example of the operation of the first priority controller illustrated in FIG. 3 is explained in detail referring to the flowchart of FIG. 4 below.

Figure 4:
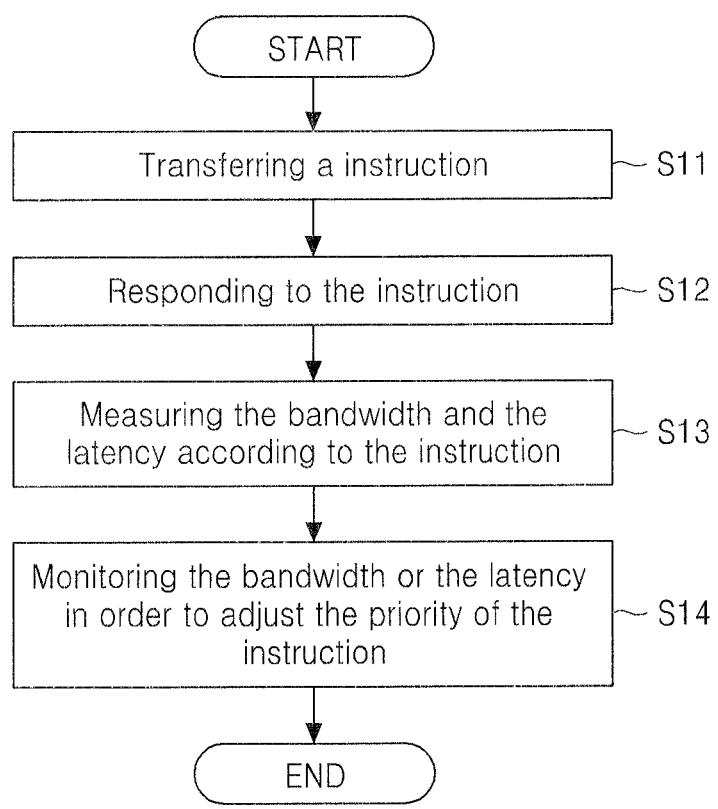
FIG. 4 is a flowchart illustrating an operation of the SoC of FIG. 1.

FIG. 4 is a flowchart illustrating an operation of the SoC of FIG. 1. Referring to FIGS. 1 to 4, at step S11 the first master 20-1 transmits a read address valid signal ARV to the first slave 40-1 through the AR-channel. At S12 the first slave 40-1 transmits a read address ready signal ARR, which is a response to a read command, to the first master 20-1 through the AR-channel.

The process wherein the first master 20-1 and the first slave 40-1 transmit and receive related signals to each other in bi-directional manner at S11 and S12 is a "handshake" mechanism. The handshake mechanism is a process wherein the first master 20-1 and the first slave 40-1 prepare for transmitting data to each other by transmitting, by the first master 20-1, a valid signal to the first slave 40-1 and transmitting, by the first slave 40-1, a ready signal to the first master 20-1. Accordingly, data transmission between the first master 20-1 and the first slave 40-1 is done when both the valid signal and the ready signal become active.

For example, the first master 20-1 transmits a read valid signal RV to the first slave 40-1 during a read operation. The first slave 40-1 transmits a read ready signal RR to the first master 20-1. In addition, the first master 20-1 transmits a write valid signal WV to the first slave 40-1 during a write operation. The first slave 40-1 transmits a write ready signal WR to the first master 20-1.

The first priority controller 31a at S13 measures at least one of bandwidth or latency based on the command and the response. The first priority controller 31a at S14 monitors at least one of the bandwidth and the latency and adjusts priority of the command according to the monitoring result.

A method of measuring bandwidth will be explained referring to FIG. 5 and a method of measuring latency will be explained referring to FIGS. 6 and 7.

Figure 5:
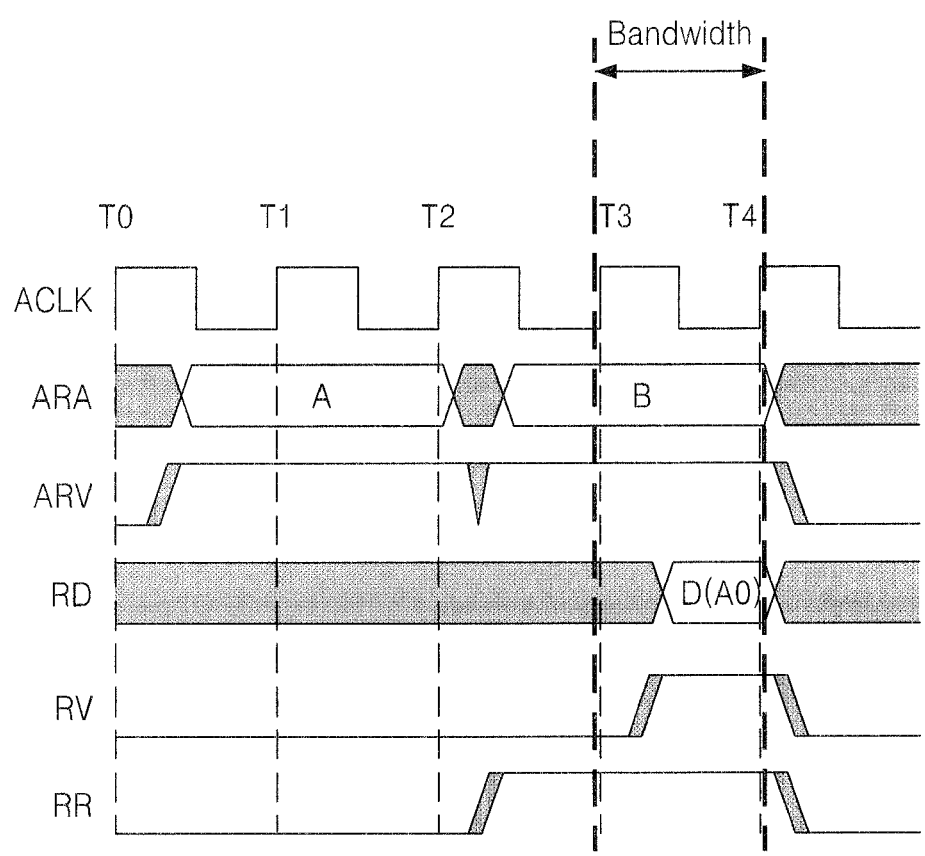
FIG. 5 is a timing diagram of signals in the first priority controller of FIG. 3 for explaining how the priority controller measures bandwidth.

FIG. 5 is a timing diagram of signals in the first priority controller of FIG. 3 for explaining how the priority controller measures bandwidth. Referring to FIGS. 1 to 5, the first priority controller 31a is synchronized to a rising edge of a clock signal ACLK. The clock signal ACLK is transmitted to the SoC 10a. Table 5 is referred for the clock signal ACLK.

Table 5 shows a signal used as a global clock signal in the bus subsystem 30.

TABLE 5

| Signal | Source | Description |
| --- | --- | --- |
| ACLK | Clock source | Global clock signal. |

The first master 20-1 at a time T1 activates a read address valid signal ARV through the AR channel and transmits an 'A' address to the first slave 40-1. The first slave 40-1 at a time T3 activates a read ready signal RR through the R-channel.

The first master 20-1 at a time T4 activates a read valid signal RV through the R channel. When both the read ready signal RR and the read valid signal RV are all activated, data D(AO) may be transmitted between the first master 20-1 and the first slave 40-1. Accordingly, the first slave 40-1 transmits a read data signal RD to the first master 20-1 between a time T3 and a time T4.

In this case, the bandwidth measured is the number of bits of data transmitted during the period of time. When it is assumed that a read data signal RD is 32 bits and a frequency of the clock signal ACLK is 100 MHz, the measured bandwidth is $32/10^{-8}$ bps. Thus, the measured bandwidth is 3.2 Gbps.

Figure 6:
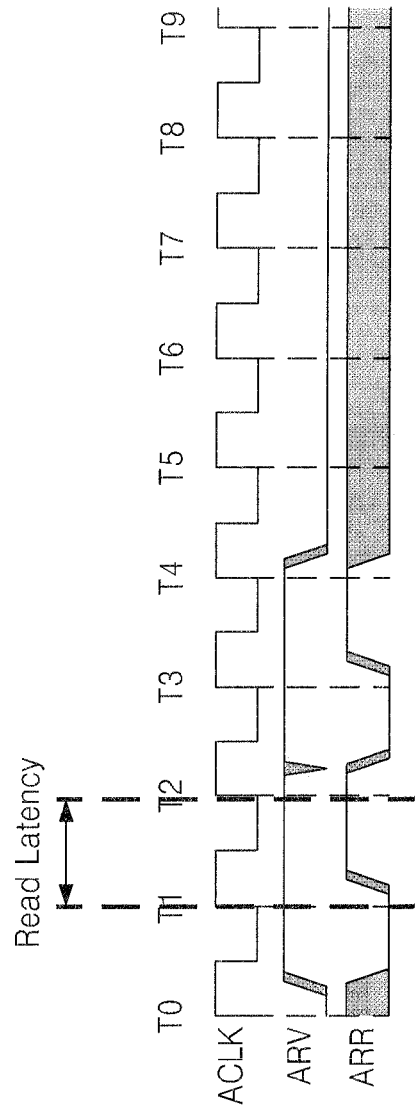
FIG. 6 is a timing diagram of signals in the first priority controller of FIG. 3 for explaining a latency when the priority controller performs a read operation.

FIG. 6 is a timing diagram of signals in the first priority controller of FIG. 3 for explaining latency when the priority controller performs a read operation. Referring to FIG. 6, latency during a read operation is between the time interval between when a read address valid signal ARV is activated and when a read address ready signal ARR is activated. Thus, latency during a read operation is between T1 and T2. When the frequency of the clock signal ACLK is 100 MHz, the measured latency is $10^{-8}$ seconds.

Figure 7:
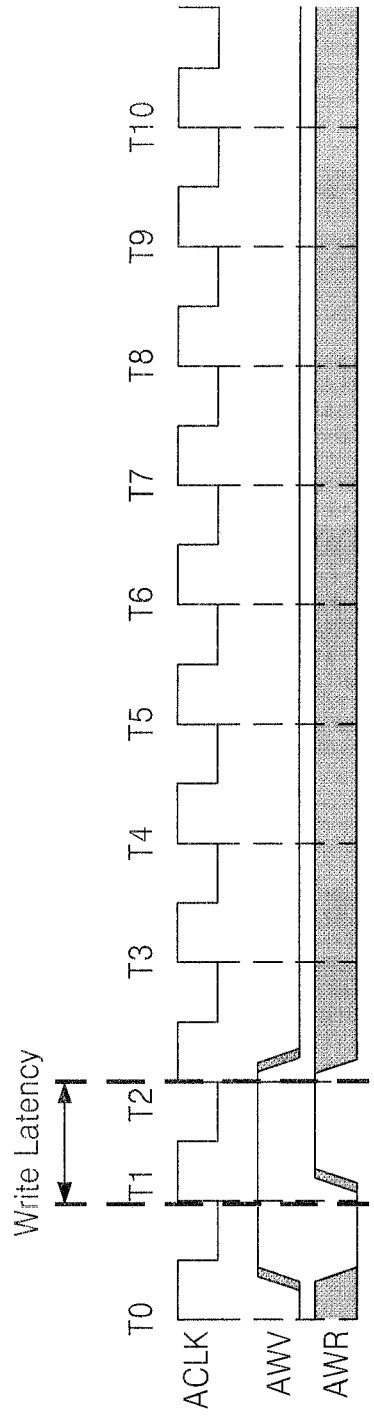
FIG. 7 is a timing diagram of signals in the first priority controller of FIG. 3 for explaining a latency when the priority controller performs a write operation.

FIG. 7 is a timing diagram of signals in the first priority controller of FIG. 3 for explaining latency when the priority controller performs a write operation. Referring to FIG. 7, latency during a write operation is between when a write address valid signal AWV is activated and when a write address ready signal AWR is activated. That is, latency during a write operation is between T1 and T2. When the frequency of the clock signal ACLK is 100 MHz, the measured latency is $10^{-8}$ seconds.

Figure 8:
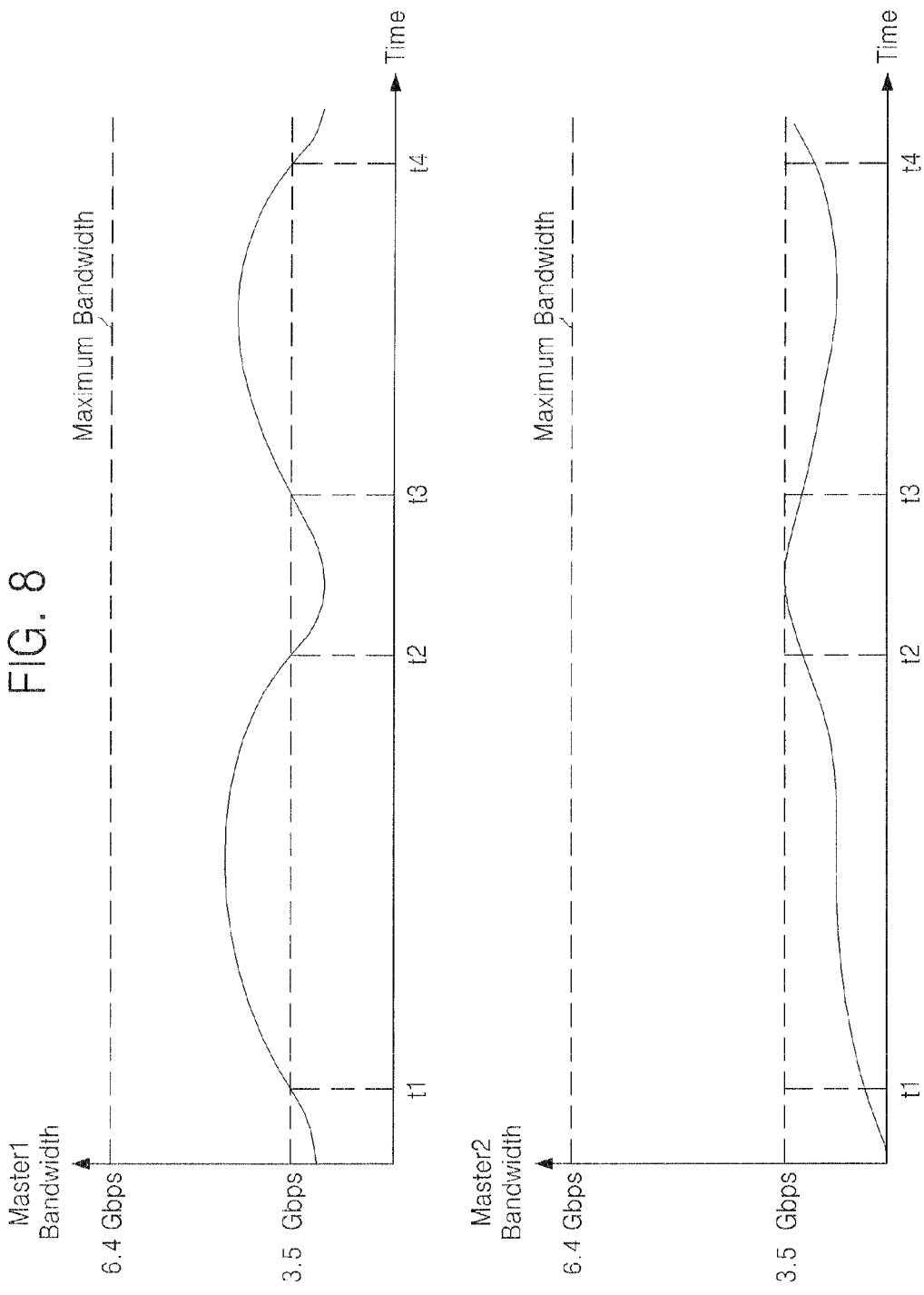
FIG. 8 is a graph of the bandwidths of the first master and the second master shown in FIG. 1.

FIG. 8 is a graph of the bandwidths of the first master and the second master shown in FIG. 1. Referring to FIG. 8, the horizontal axes indicate time and the vertical axes indicate bandwidth. Maximum bandwidth of the bus subsystem 30 is supposed to be 6.4 Gbps and an appropriate bandwidth where a master occupies the bus subsystem 30, i.e., the bandwidth reference value, is set to 3.5 Gbps. Between times t1 and t2, and between times t3 and t4, the bandwidth of the first master 201 (Master1 in FIG. 8) exceeds the bandwidth reference value of the bus subsystem 30, 3.5 Gbps. For this reason, network occupancy of the second master 20-2 (Master2 in FIG. 8) becomes smaller than the bandwidth reference value.

When the first master 20-1 is a microprocessor, the first master 20-1 may include an internal cache memory. When the first master 20-1, after performing a first operation, performs a second operation which is totally different from the first operation, the first master 20-1 flushes all data of the cache memory and stores data necessary for the second operation in the cache memory. Flushing data of the cache memory and storing new data in the cache memory may cause the bandwidth of the first master 20-1 to exceed the bandwidth reference value, 3.5 Gbps.

Figure 9:
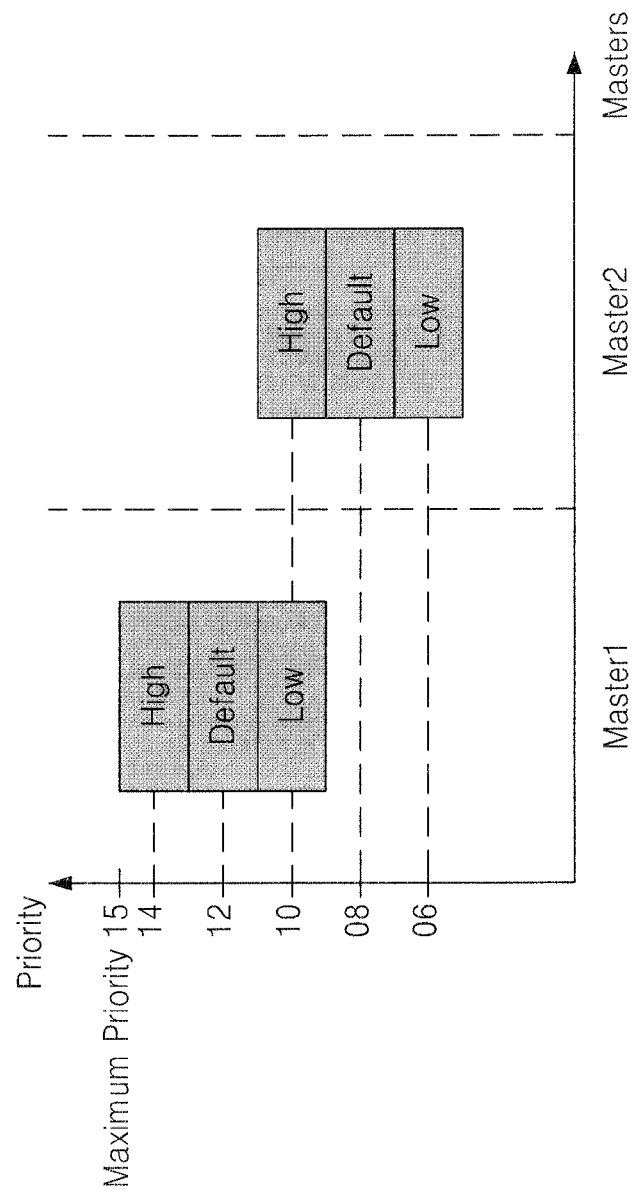
FIG. 9 is a graph of the priorities of the first master and the second master shown in FIG. 1.

FIG. 9 is a graph illustrating priorities of the first master and the second master illustrated in FIG. 1. In this exemplary embodiment, the first master 20-1 is implemented as a microprocessor and the second master 20-1 is implemented as a graphic processor. A designer of the SoC 10a sets the priority so that a command of the first master 20-1 is preferentially performed rather than a command of the second master 20. Thus, to make a specific master's commands be performed preferentially rather than the other masters, a designer of the SoC 10a sets the priority of the preferred specific master higher.

Referring to FIG. 9, the horizontal axis indicates a master and the vertical axis indicates its priority. It is illustrated that the priority generator 31-4 of the present inventive concept adjusts each priority for the first master 20-1 to the fourth master 20-4 to three predetermined levels (e.g., "High", "Default", and "Low").

In the example design shown in FIG. 9, the "default" priority of the first master 20-1 is 12 and the "default" priority of the second master 20-2 is 8. The priority of the first master 20-1 is set to 14 when "high", and is set to 10 when "low". The priority of the second master 20-2 is set to 10 when "high", and is set to 6 when "low". A designer of the exemplary SoC 10a thus has designed it to process a command of the first master 20-1 preferentially over a command of the second master 20-2. Thus, a designer of the exemplary SoC 10a has designed that the network (e.g., the bus subsystem 30) occupancy of the first master 20-1 is higher than the network (e.g., the bus subsystem 30) occupancy of the second master 20-2.

Figure 10:
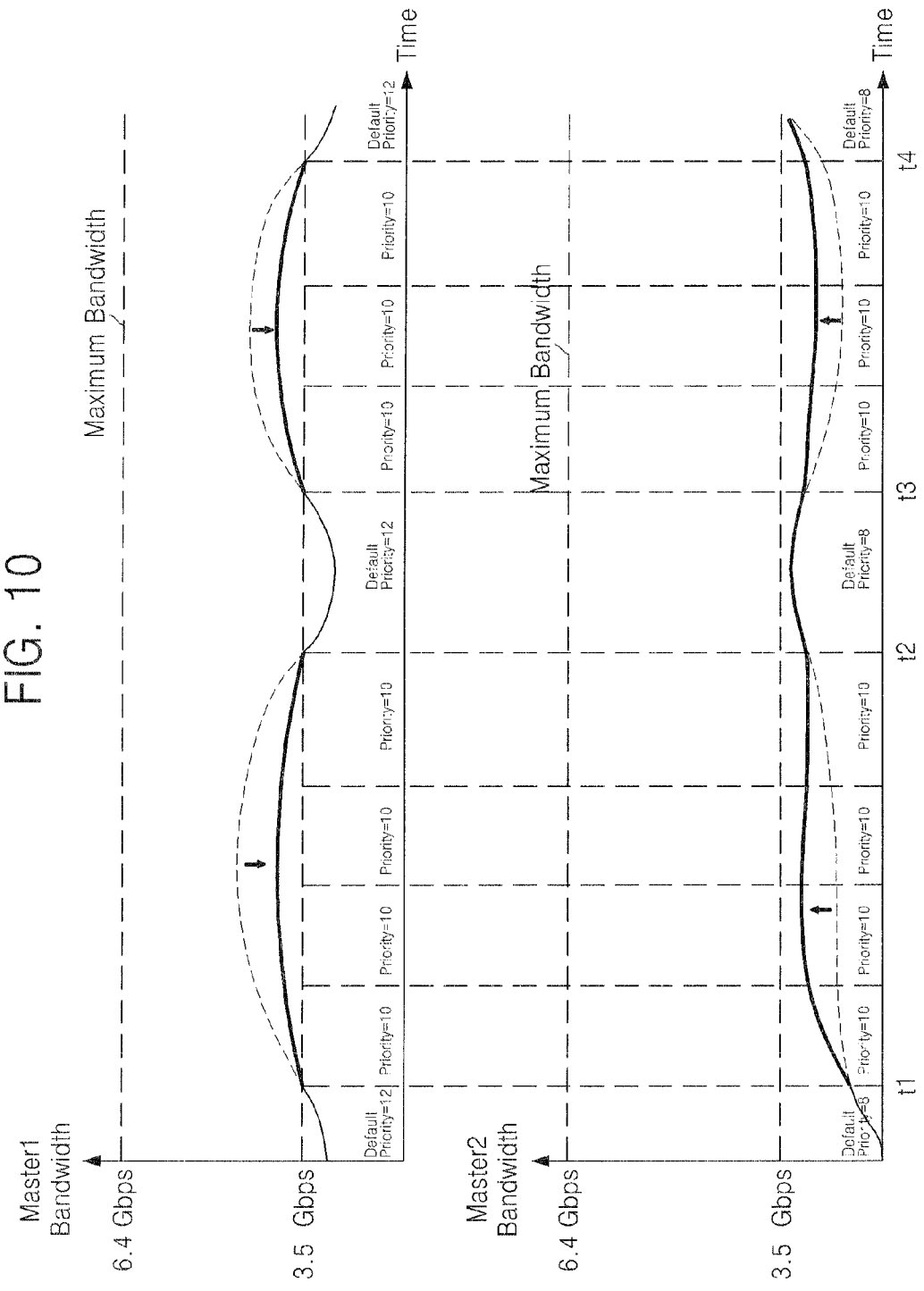
FIG. 10 is a graph illustrating changes of the bandwidth of the first master and of the second master according to an operation of the SoC of FIG. 1.

FIG. 10 is a graph illustrating changes of the bandwidth of the first master and of the second master according to an operation of the SoC of FIG. 1. Referring to FIG. 10, the horizontal axes indicate time and the vertical axes indicate bandwidth. Maximum bandwidth of the bus subsystem 30 is supposed to be 6.4 Gbps and each reference bandwidth of the first master 20-1, the second master 20-2, the third master 20-3 and the fourth master 20-4 is set to 3.5 Gbps.

As illustrated in FIG. 9, the default priority of the first master 20-1 is set to 12 and the default priority of the second master 20-2 is set to 8. Thus, a designer of the SoC 10a sets the default priority of the first master 20-1 to be higher than the default priority of the second master 20-2 so that an operation of the first master 20-1 may be processed preferentially rather than an operation of the second master 20-2.

Referring to FIG. 0, between times t1 and t2, and between times t3 and t4, the bandwidth of the first master 20-1 exceeds the reference bandwidth of the bus subsystem 30, 3.5 Gbps. For this reason, the network occupancy of the second master 20-2 gets lower than the reference bandwidth.

Between times t1 and t2, and between time t3 and t4, the first priority controller 31a lowers the priority of the first master 20-1 to 10, and the second priority controller 32a raises the priority of the second master 20-2 to 10. Accordingly, each bandwidth of the first master 20-1 and the second master 20-2 moves to a thick solid line along a direction of dark solid arrow.

Between times t2 and t3, bandwidth of the first master 20-1 does not exceed reference bandwidth of the bus subsystem 30, 3.5 Gbps, so that the first priority controller 31a does not operate. Accordingly, the priority of the first master 20-1 retains a default value of 12 and its bandwidth does not change.

When the bandwidth of a specific master exceeds a reference value or when a specific master accesses a slave which has a high outstanding count, a SoC 10b according to another exemplary embodiment blocks bandwidth of the specific master.

Figure 11:
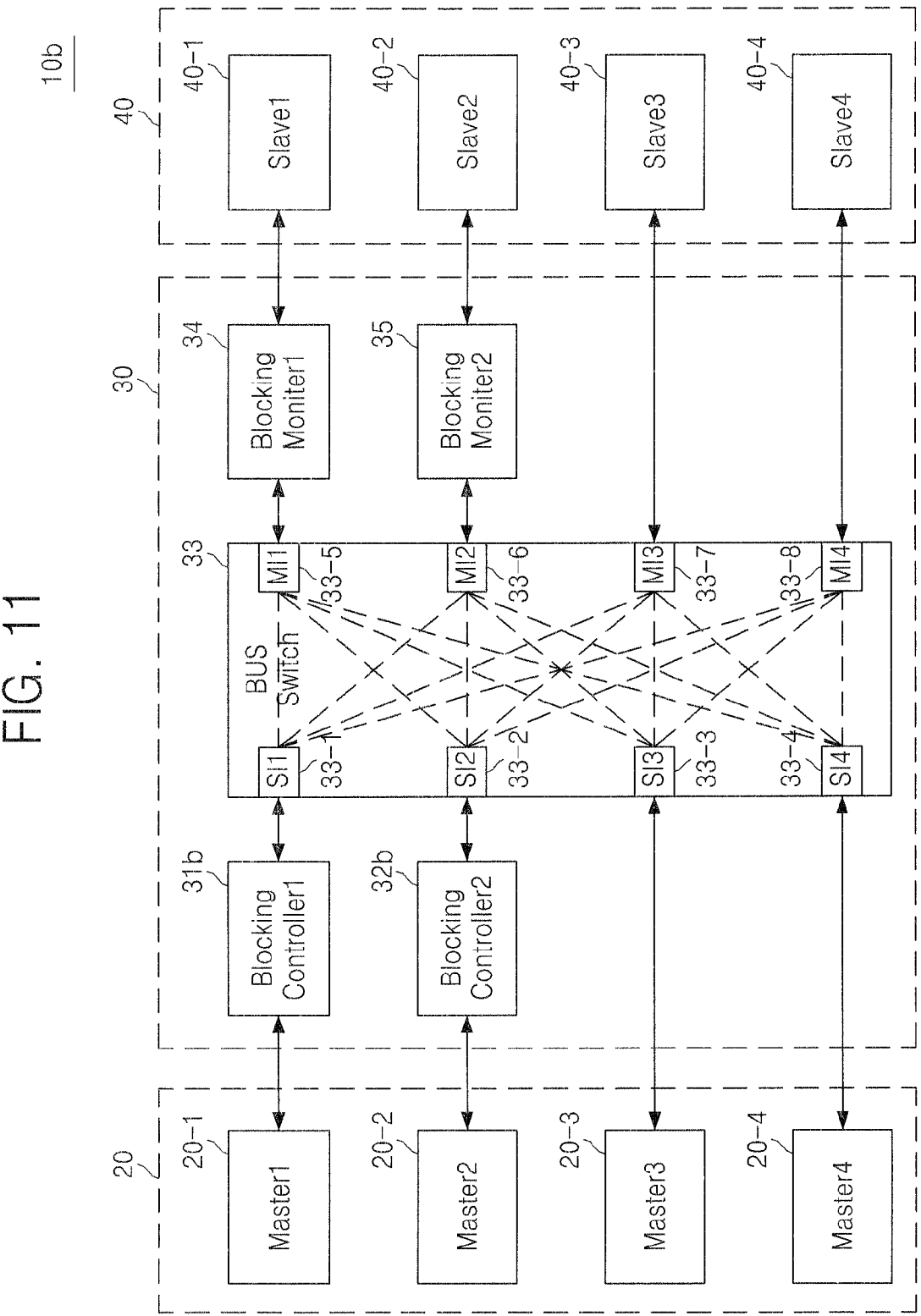
FIG. 11 is a block diagram of a SoC according to second exemplary embodiment.

The SoC according to another exemplary embodiment is explained in detail referring to FIGS. 11 to 17. FIG. 11 is a block diagram of a SoC according to second exemplary embodiment. Referring to FIG. 11, the SoC 10b includes a plurality of masters 20, a bus subsystem 30 and a plurality of slaves 40. The SoC 10b is manufactured in a single semiconductor chip, so it may be embodied in a chip package.

The plurality of masters 20 and the plurality of slaves 40 are the same as in FIG. 1.

The bus subsystem 30 includes a first blocking controller 31b, a second blocking controller 32b, a bus switch 33, a first blocking monitor 34 and a second blocking monitor 35. For convenience of explanation, FIG. 11 illustrates only two blocking controllers 31b and 32b and two blocking monitors 34 and 35; however, in alternative embodiments, a blocking controller may be embodied between each of the masters 20-3 and 20-4 and each of the slave-interfaces 33-3 and 33-4, and a blocking monitor may be embodied between each of the master-interface 33-7 and 33-8 and each of the slaves 40-3 or 40-4.

The bus switch 33 is the same as in FIG. 1. The second blocking controller 32b has the same configuration as the first blocking controller 31b in FIG. 1. The first blocking controller 31b is explained in detail referring to FIG. 12.

The first blocking monitor 34 monitors an operation status value of the first slave 40-1. The second blocking monitor 35 monitors an operation status value of the second slave 40-2. A blocking monitor may be embodied only in a slave whose operation status value needs monitoring. A blocking monitor may be embodied in all slaves to monitor an operation status value of all slaves.

For example, the first block monitor 34 transmits an operation status value of the first slave 40-1 to the first blocking controller 31b through the bus switch 33. The first blocking controller 31b blocks a command of the first master 20-1, when it accesses the first slave 40-1, when the operation status value is greater than an operation status reference value. Each operation of the first blocking monitor 34 and the second blocking monitor 35 will be explained in detail referring to FIGS. 13 to 14.

The operation status value includes an outstanding count. The outstanding count increases by 1 whenever a master outputs a command, and decreases by 1 whenever a slave responds to the command. High outstanding count means that a slave has received many commands output from each of a plurality of masters, and indicates that an operation status of the slave is "busy".

In addition, low outstanding count means a slave has received few commands output from each of the plurality of masters, and indicates that an operation status of the slave is "idle". A method of measuring an outstanding count during a read operation or a write operation will be explained in detail referring to FIGS. 15 and 16.

Figure 12:
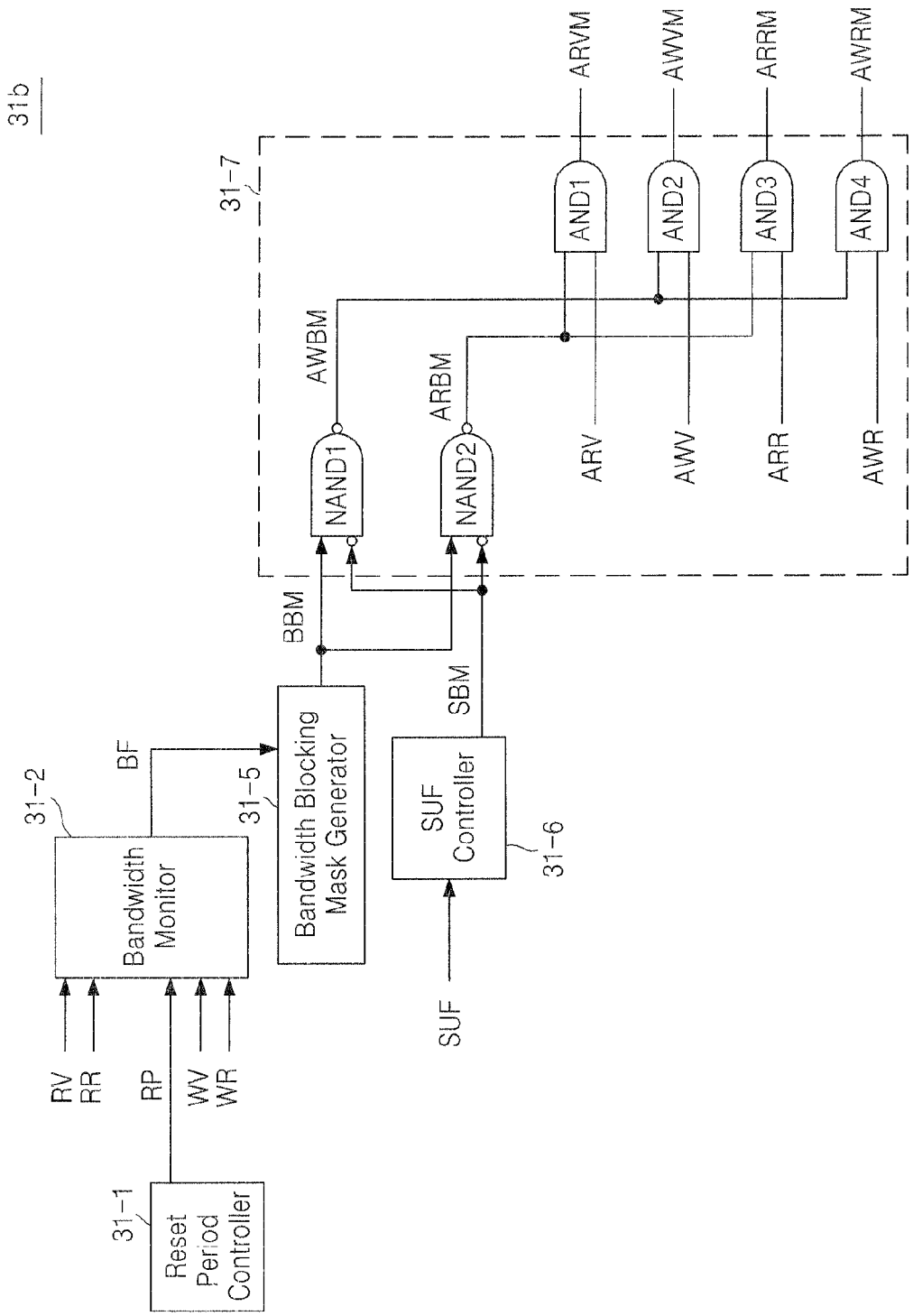
FIG. 12 is a block diagram illustrating the first blocking controller shown in FIG. 11.

FIG. 12 is a block diagram illustrating the first blocking controller shown in FIG. 11 in detail. Referring to FIGS. 11 and 12, the first blocking controller 31b includes a reset period controller 31-1, a bandwidth monitor 31-2, a bandwidth blocking mask generator 31-5, a system utilization feedback (SUF) controller 31-6 and a combinational circuit 31-7.

The Reset period controller 31-1 and the bandwidth monitor 31-2 are the same as in FIG. 3.

The bandwidth blocking mask generator 31-5 receives bandwidth information BF from the bandwidth monitor 31-2. The bandwidth blocking mask generator 31-5 transmits a bandwidth blocking mask signal BBM, which is for blocking the first master 20-1 from occupying the bus switch 33 more than a predetermined bandwidth, i.e., the reference bandwidth, to the combination circuit 31-7. For example, when the bandwidth of the bus subsystem 30, which may be occupied by the first master 20-1, is assumed to be 3.5 Gbps, and when any bandwidth of commands output from the first master 20-1 to the first slave 40-1 is greater than 3.5 Gbps, the bandwidth blocking mask generator 31-5 transmits the bandwidth blocking mask signal BBM to the combination circuit 31-7.

The SUF controller 31-6 receives a system utilization feedback (SUF) generated by the first blocking monitor 34. The system utilization information feedback (SUF) includes outstanding count.

When the first master 20-1 is attempts to access the first slave 40-1, an outstanding count shows an operation status of the first slave 40-1. The SUF controller 31-6 transmits a system blocking mask signal SBM to the combination circuit 31-7. The system blocking mask signal SBM is transmitted for blocking the first master 20-1 from occupying the bus subsystem 30 greater than predetermined bandwidth.

For example, when an outstanding count of the first slave 40-1 is greater than 10, the first slave 40-1 is assumed to be in a busy status. If the outstanding count of the first slave 40-1 is currently 12, an operation status of the first slave 40-1 is in a busy status. In this case, the SUF controller 31-6 transmits a system blocking mask signal SBM for blocking a command accessing the first slave 40-1 to the combination circuit 31-7.

When the first master 20-1 occupies the bus subsystem 30 greater than a predetermined bandwidth or when the first master 20-1 occupies the bus subsystem 30 greater than a predetermined bandwidth according to an outstanding count, the combination circuit 31-7 blocks a command of the first master 20-1.

The combination circuit 31-7 generates a plurality of mask signals ARVM, AWVM, ARRM and AWRM for AW-channel signals and AR-channel signals in order to block a command of the first master 20-1. The combination circuit 31-7 includes a first NAND-gate NAND1, a second NAND-gate NAND2, a first AND-gate AND1, a second AND-gate AND2, a third AND-gate AND3 and a fourth AND-gate AND4.

The first NAND-gate NAND1 receives a bandwidth blocking mask signal BBM from the bandwidth blocking mask generator 31-5 and an inverted signal of the system blocking mask signal SBM generated by the SUF controller 31-6. The first NAND-gate NAND 1 generates a AW-channel blocking mask signal AWBM it to the second AND-gate AND2 and a fourth AND-gate AND4. An output signal AWBM of the first NAND-gate NAND1 is used to mask a write address valid signal AWV and a write address ready signal AWR during a write operation.

The second NAND-gate NAND2 receives a bandwidth blocking mask signal BBM from the bandwidth blocking mask generator 31-5 and an inverted signal of the system blocking mask signal SBM generated by the SUF controller 31-6. The second NAND-gate NAND2 generates an AR-channel blocking mask signal ARBM and transmits it to the first AND-gate AND1 and the third AND-gate AND3. An output signal ARBM of the second NAND-gate NAND2 is used to mask a read address valid signal ARV and a read address ready signal ARR during a read operation.

The first AND-gate AND1 receives a read address valid signal ARV from the first master 20-1 and an AR-channel blocking mask signal ARBM from the second NAND-gate NAND2. The first AND-gate AND1 generates a read address valid mask signal ARVM and transmits it to the first slave 40-1 through the bus switch 33.

The second AND-gate AND2 receives a write address valid signal AWV from the first master 20-1 and an AW-channel blocking mask signal AWBM from the first NAND-gate NAND1. The second AND-gate AND2 generates a write address valid mask signals AWVM and transmits it to the first slave 40-1 through the bus switch 33.

The third AND-gate AND3 receives a read address ready signal ARR from the first slave 40-1 and an AR-channel blocking mask signal ARBM from the second NAND-gate NAND2. The third AND-gate AND3 generates a read address ready mask signal ARRM and transmits it to the first slave 40-1 through the bus switch 33.

The fourth AND-gate AND4 receives a write address ready signal AWR from the first slave 40-1 and an AW-channel blocking mask signal AWBM from the first NAND-gate NAND1. The fourth AND-gate AND4 generates a write address ready mask signal ARRM and transmits it to the first slave 40-1 through the bus switch 33.

When a read address valid mask signal ARVM and a read address ready mask signal ARRM are activated, data transmission from the first slave 40-1 to the first master 20-1 is blocked during a read operation. When a write address valid mask signal AWVM and a write address ready mask signal ARRM are activated, data transmission from the first master 20-1 to the first slave 40-1 is blocked during a write operation.

The bandwidth blocking mask generator 31-5 generates a bandwidth blocking mask signal BBM when the first master 20-1 comes to occupy more than predetermined bandwidth. The SUF controller 31-6 generates a system blocking mask signal SBM, which is for blocking the first master 20-1 from occupying the bus subsystem 30 greater than predetermined bandwidth, according to system utilization information SUF.

For example, when a bandwidth blocking mask signal BBM is logic 1 (logic high level), a command of the first master 20-1 during a read operation or a write operation is blocked. In addition, when a system blocking mask signal SBM is logic 0 (logic low level), a command of the first master 20-1 during a read operation or a write operation is blocked.

A system blocking mask signal SBM is inverted and input to the first NAND-gate NAND1 and input to the second NAND-gate NAND2.

When the bandwidth blocking mask signal BBM is logic 1, an AW-channel blocking mask signal AWBM and an AR-channel blocking mask signal ARBM become logic 0. Accordingly, outputs of the first AND-gate AND1, the second AND-gate AND2, the third AND-gate AND3 and the fourth AND-gate AND4 become logic 0. Thus, when the bandwidth blocking mask signal BBM is logic 1, a read address valid mask signal ARVM and a read address ready mask signal ARRM, and a write address valid mask signal AWVM and a write address ready mask signal ARRM are masked.

In addition, when the system blocking mask signal SBM is logic 0, the AW-channel blocking mask signal AWBM and the AR-channel blocking mask signal ARBM become logic 0. Accordingly, outputs from the first AND-gate AND1, the second AND-gate AND2, the third AND-gate AND3 and the fourth AND-gate AND4 become all logic 0. Thus, when the system blocking mask signal SBM is logic 0, the read address valid mask signal ARVM and the read address ready mask signal ARRM, and the write address valid mask signal AWVM and the write address ready mask signal ARRM are masked.

Moreover, when the bandwidth blocking mask signal BBM is logic 1 and the system blocking mask signal SBM is logic 1, the AW-channel blocking mask signal AWBM and the AR-channel blocking mask signal ARBM become logic 1. Accordingly, in this case, the read address valid mask signal ARVM and the read address ready mask signal ARRM, and the write address valid mask signal AWVM and the write address ready mask signal ARRM are not masked.

A specified operation of the first blocking controller 31b shown in FIG. 11 is explained in detail referring to FIG. 13 below.

Figure 13:
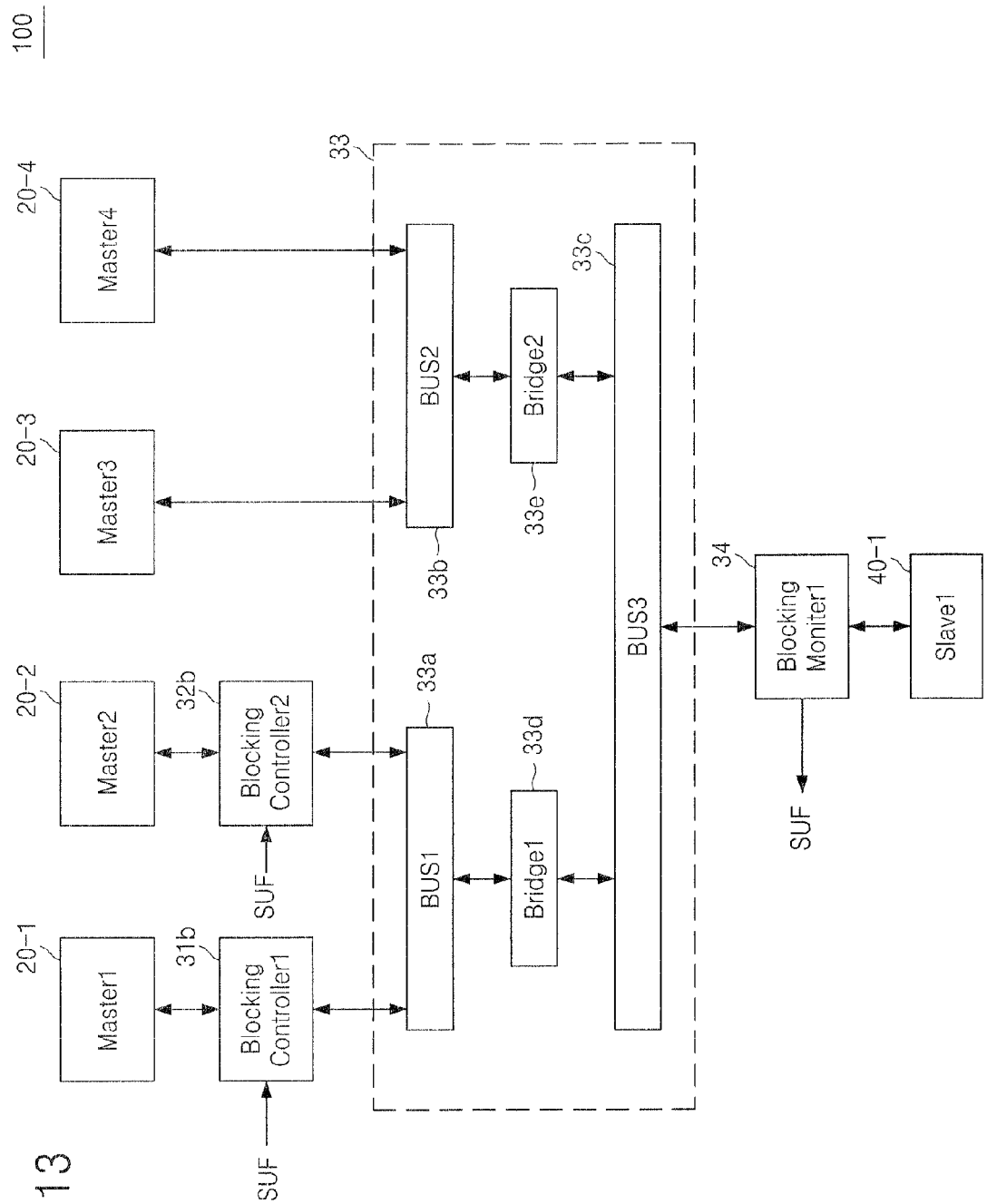
FIG. 13 is a block diagram of the SoC of FIG. 11 for explaining the first blocking controller, a second blocking controller and a first blocking monitor.

FIG. 13 is a block diagram of the SoC of FIG. 11 for explaining the first blocking controller 31b, the second blocking controller 32b, and the first blocking monitor 34 shown in FIG. 11. Referring to FIGS. 11 to 13, when the first master 20-1 accesses the first slave 40-1, the bandwidth blocking mask generator 31-5 and the combination circuit 31-7 generate a signal blocking bandwidth of the first master 20-1.

The read address valid mask signal ARVM, the write address valid mask signal AWVM, the read address ready mask signal ARRM and/or the write address ready mask signal AWRM are signals blocking bandwidth. When each of the said signals is activated, data transmission between the first master 20-1 and the first slave 40-1 is stopped.

At least one of the first master 20-1 to the fourth master 20-4 accesses the first slave 40-1. The first blocking monitor 34 measures its outstanding count which is system utilization information SUF from the first slave 40-1. The first blocking monitor 34 transmits the system utilization information SUF to each of the first blocking controller 31b and the second blocking controller 32b.

The bus switch 33 includes a first bus 33a, a second bus 33b, a third bus 33c, a first bridge 33d and a second bridge 33e. The bus switch 33 may be implemented in a hierarchical bus structure as illustrated in FIG. 11. The first bridge 33d adjusts the data width and the clock frequency between the first bus 33a and the third bus 33c. The second bridge 33e adjusts the data width and the clock frequency between the second bus 33b and the third bus 33c.

Figure 14:
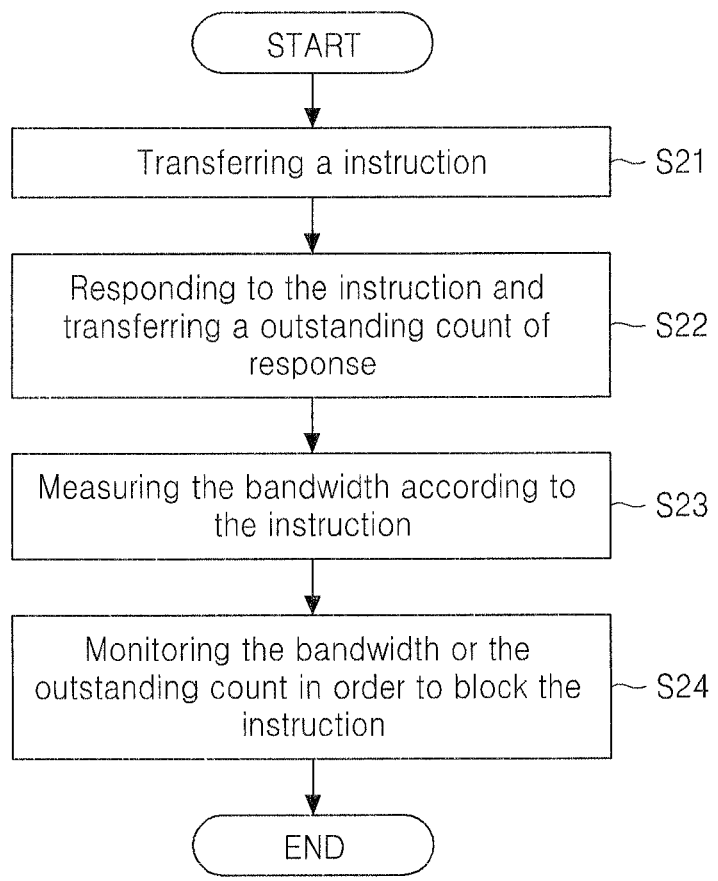
FIG. 14 is a flowchart of an operation of the SoC of FIG. 11.

FIG. 14 is a flowchart of an operation of the SoC of FIG. 11. An operation of the SoC 10b of FIG. 11 according to another exemplary embodiment is explained in detail referring to a flowchart of FIG. 14. FIG. 14 is a flowchart illustrating an operation of the SoC illustrated in FIG. 11. Referring to FIG. 14, at step S21 the first master 20-1 transmits a read address valid signal ARV to the first slave 40-1 through an AR-channel. At step S22 the first slave 40-1 transmits a read address ready signal ARR which is a response to a read command to the first master 20-1 through the AR-channel. The first blocking monitor 34 transmits an outstanding count which is an operation status value of the first slave 40-1 to the first blocking controller 31b.

At step S23 the first blocking controller 31b measures bandwidth based on the command and the response. At step S24 the first blocking controller 31b monitors bandwidth and an outstanding count and blocks bandwidth of the first master 20-1 according to the monitoring result.

For example, when each bandwidth reference value of the first master 20-1 and the second master 20-2 is 3.5 Gbps, each of the first blocking controller 31b and the second blocking controller 32b blocks commands which are greater than 3.5 Gbps among commands output from each of the first master 20-1 and the second master 20-2. This step is called blocking bandwidth. Accordingly, bandwidth of the first master 20-1 may not exceed 3.5 Gbps. When the second master 20-2 does not use the bus subsystem 30, it may release the first master 20-1 from the blocking bandwidth step.

In addition, an operation status reference value of each outstanding count of the first slave 40-1, the second slave 40-2, the third slave 40-3 and the fourth slave 40-4 may be set to 10. When the first master 20-1 accesses the first slave 40-1 and an outstanding count of the first slave 40-1 is greater than 10, the first blocking controller 31b blocks the first master 20-1 from accessing the first slave 40-1. A method of measuring outstanding count will be explained referring to FIGS. 15 and 16.

Figure 15:
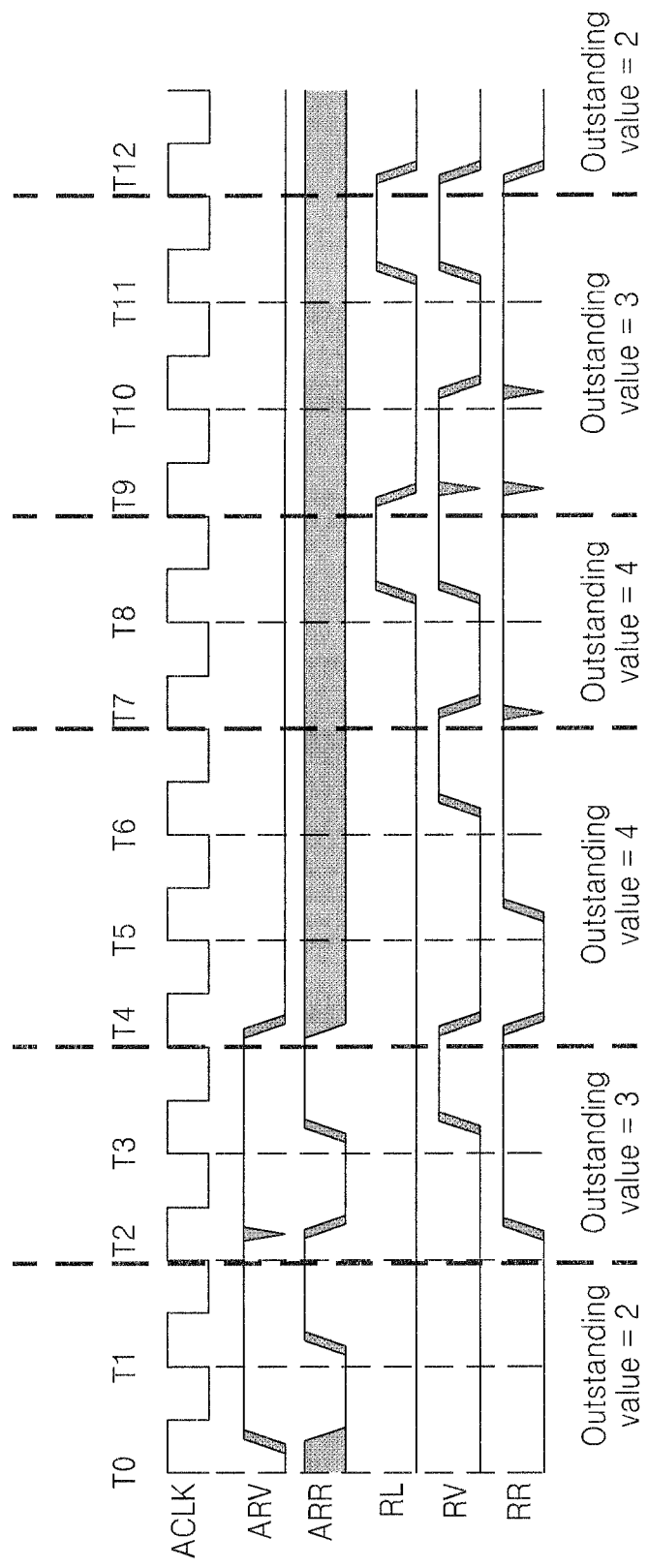
FIG. 15 is a timing diagram of signals in the first blocking controller of FIG. 12 for explaining an outstanding count during a read operation.

FIG. 15 is a timing diagram of signals in the first blocking controller of FIG. 12 for explaining an outstanding count during a read operation. The outstanding count indicates an operation status value of a slave. Referring to FIG. 15, the outstanding count during a read operation increases by 1 whenever a read address valid signal ARV and a read address ready signal ARR are activated, and decreases by 1 whenever a read last signal RL, a read valid signal RV and a read ready signal RR are activated.

If the outstanding count at time T1 is 2, and if a read address valid signal ARV and a read address ready signal ARR are activated, then the outstanding count increases to 3. Likewise, if a read address valid signal ARV and a read address ready signal ARR are activated at time T4, the outstanding count increases to 4. However, if a read last signal RL, a read valid signal RV and a read ready signal RR are all activated at time T9, the outstanding count decreases to 3.

Figure 16:
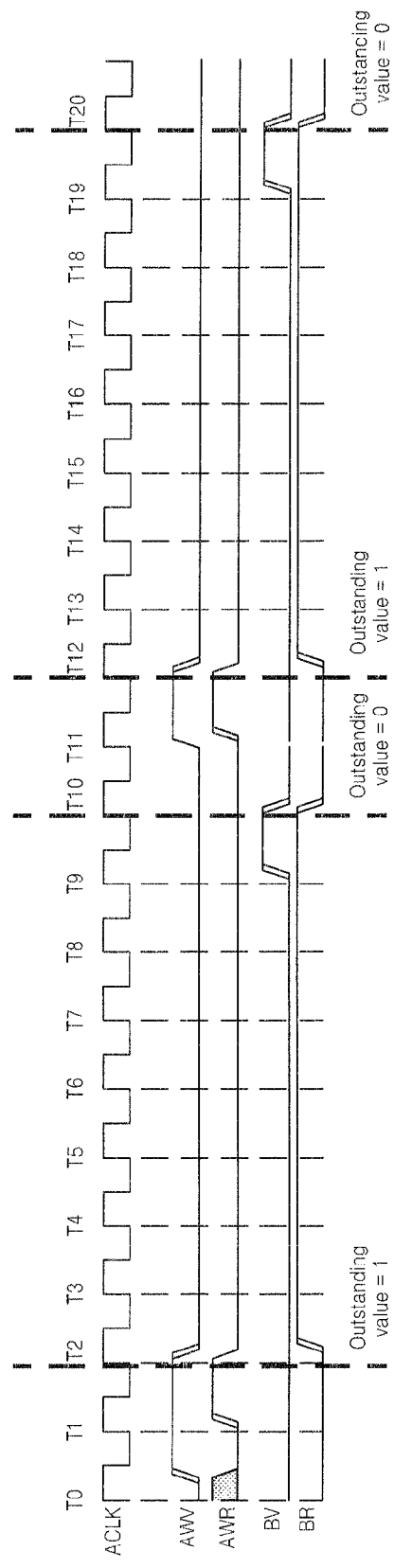
FIG. 16 is a timing diagram of signals in the first blocking controller of FIG. 12 for explaining an outstanding count during a write operation.

FIG. 16 is a timing diagram of signals in the first blocking controller of FIG. 12 for explaining an outstanding count during a write operation. Referring to FIG. 16, an outstanding count during a write operation increases by 1 whenever the write address valid signal AWV and the write address ready signal AWR are activated. And the outstanding count during a write operation decreases by 1 whenever the write response valid signal BV and the write response ready signal BR are activated.

If an outstanding count at time T9 is 1, and if a write response valid signal BV and a write response ready signal BR are activated at time T10, then the outstanding count decreases to 0. If a write response valid signal BV and a write response ready signal BR are activated at time T12, then the outstanding count increases to 1. If a write response valid signal BV and a write response ready signal BR are activated at time T20, the outstanding count decreases to 0.

Table 6 refers to the write response valid signal BV (BVALID) and the write response ready signal BR (BREADY) of FIG. 16. Table 6 shows a plurality of signals used in a B-channel.

TABLE 6

| Signal | Source | Description |
| --- | --- | --- |
| BVALID | Slave | Write response valid. |
| BREADY | Master | response ready. |

Figure 17:
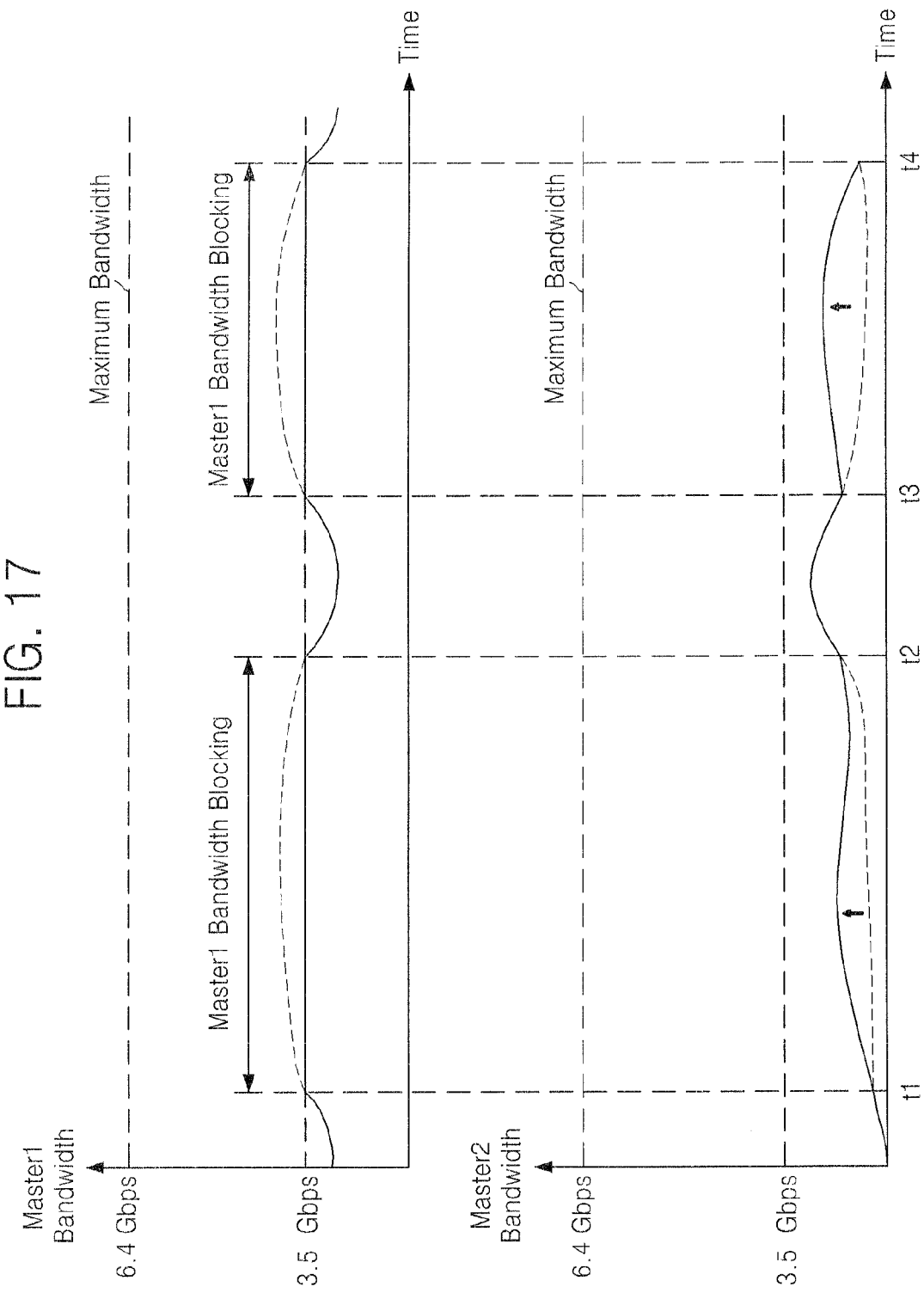
FIG. 17 is a graph illustrating changes of the bandwidth of a first master and of a second master according to an operation of the SoC illustrated in FIG. 11.

FIG. 17 is a graph illustrating changes of the bandwidth of the first master and the second master according to an operation of the SoC of FIG. 11. Referring to FIG. 17, the horizontal axes indicate time and the vertical axes indicate bandwidth. When the maximum bandwidth of the bus subsystem 30 is assumed to be 6.4 Gbps, each reference bandwidth of the first master 20-1, the second master 20-2, the third master 20-3 and the fourth master 20-4 is set to 3.5 Gbps.

Between times t1 and t2, and between times t3 and t4, the bandwidth of the first master 20-1 exceeds reference bandwidth of the bus subsystem 30, 3.5 Gbps. Accordingly, the first blocking controller 31b blocks bandwidth of the first master 20-1 between times t1 and t2, and between times t3 and t4. Between times t1 and t2, and between times t3 and t4, bandwidth of the second master 20-1 will move to a thick solid line along a direction of dark solid arrows.

Between times t2 and t3, bandwidth of the first master 20-1 does not exceed the reference bandwidth of the bus subsystem 30, 3.5 Gbps, so the first blocking controller 31b doesn't operate. Accordingly, bandwidth which the second master 20-2 occupies does not change.

When blocking bandwidth because bandwidth of a specific master exceeds a reference value, the SoC 10b according to second exemplary embodiment releases blocked bandwidth when an outstanding count of a slave is low. The SoC 10b according to second exemplary embodiment is explained in detail referring to FIGS. 18 and 19.

Figure 18:
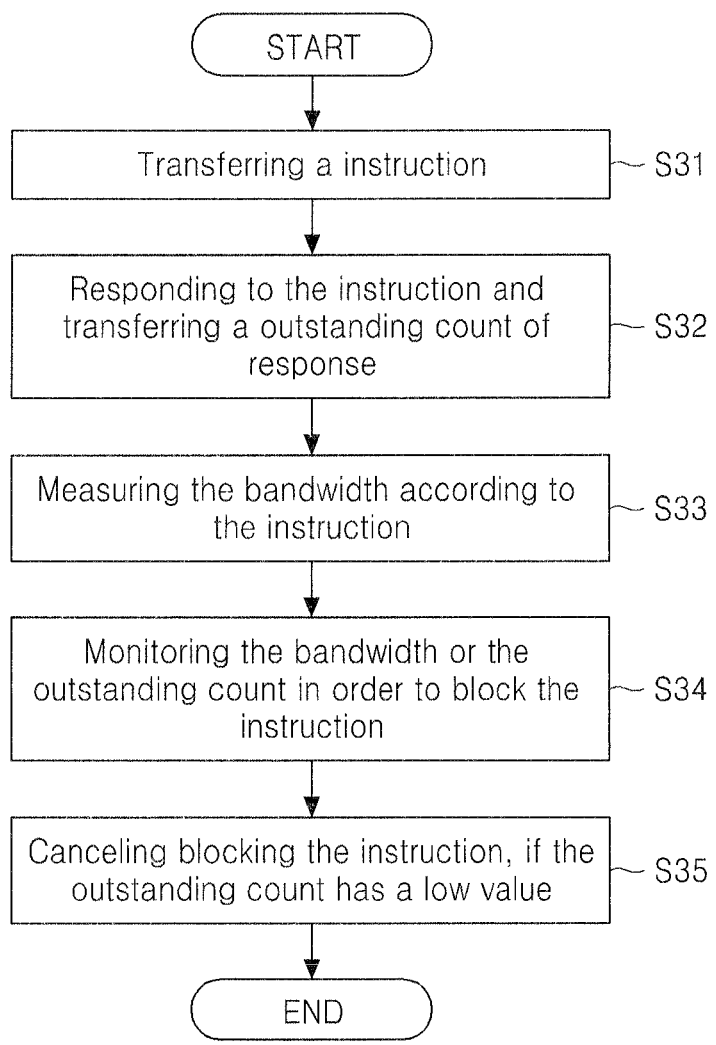
FIG. 18 is a flowchart of an operation of the SoC of FIG. 11.

FIG. 18 is a flowchart of an operation of the SoC of FIG. 11 according to another exemplary embodiment. Referring to FIGS. 11, 12 and 18, the first master 20-1 transmits a read address valid signal ARV to the first slave 40-1 through an AR-channel at S31. The first slave 40-1 at S32 transmits a read address ready signal ARR which is a response to a read command to the first master 20-1 through the AR-channel. The first blocking monitor 34 transmits an outstanding count which is an operation status value of the first slave 40-1 to the first blocking controller 31b through the bus switch 33.

The first blocking controller 31b at S33 measures bandwidth based on the command and the response. At step S34, the first blocking controller 31b monitors bandwidth and an outstanding count, and blocks (or limits) bandwidth of the first master 20-1 according to the monitoring result. At step S35 the first blocking controller 31b, when blocking or limiting the bandwidth since bandwidth of the first master 20-1 exceeds bandwidth reference value, releases blocked bandwidth when an outstanding count of the first slave 40-1 is lower than a reference value, i.e., an operation status reference value.

For example, when a reference value of each bandwidth of the first master 20-1, the second master 20-2, the third master 20-3 and the fourth master 20-4 is 3.5 Gbps, each of the first blocking controller 31b and the second blocking controller 32b blocks a command greater than 3.5 Gbps among commands output from the first master 20-1 and the second master 20-2.

In addition, when a reference value of each outstanding count of the first slave 40-1, the second slave 40-2, the third slave 40-3 and the fourth slave 40-4 is set to 10, the first blocking controller 31b blocks the first master 20-1 from accessing the first slave 40-1 when an outstanding count of the first slave 40-1 is greater than 10 when the first master 20-1 accesses the first slave 40-1.

When the outstanding count of the first slave 40-1 is less than 10 even though bandwidth of the first master 20-1 exceeds 3.5 Gbps, the first blocking controller 31b allows the first master 20-1 whose bandwidth is blocked to occupy the bus subsystem 30 again.

Figure 19:
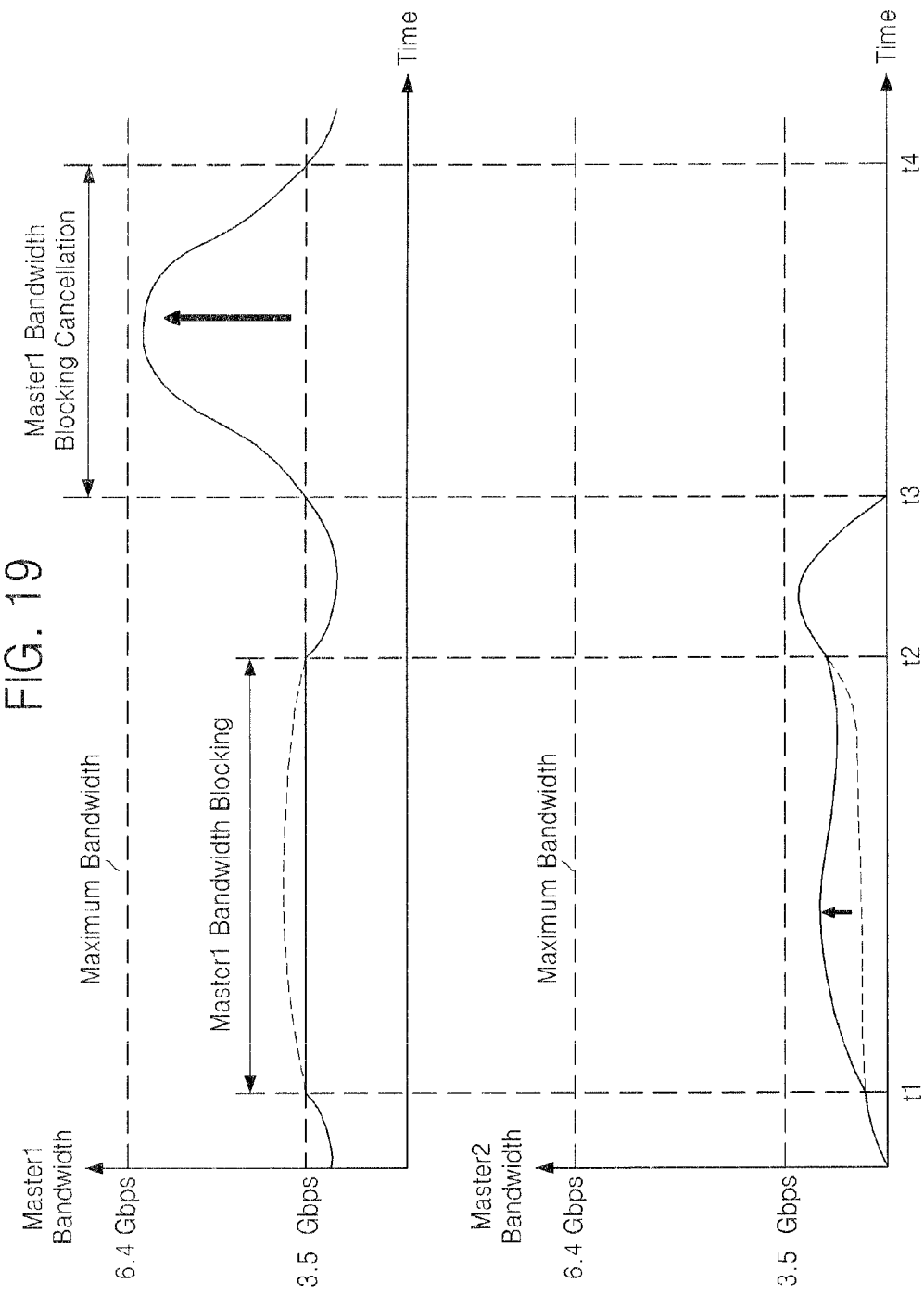
FIG. 19 is a graph illustrating changes of the bandwidth of the first master and of the second master according to an operation of the SoC of FIG. 11.

FIG. 19 is a graph illustrating changes of the bandwidth of the first master and of the second master according to an operation of the SoC of FIG. 11. Referring to FIG. 19, the horizontal axes indicate time and the vertical axes indicate bandwidth. Maximum bandwidth of the bus subsystem 30 is assumed to be 6.4 Gbps, and each reference bandwidth of the first master 20-1, the second master 20-2, the third master 20-3 and the fourth master 20-4 is set to 3.5 Gbps.

Between times t1 and t2, the bandwidth of the first master 20-1 exceeds reference bandwidth of the bus subsystem 30, 3.5 Gbps. Accordingly, the first blocking controller 31b blocks bandwidth of the first master 20-1 between times t1 and t2. Between times t3 and t4, the bandwidth of the first master 20-1 exceeds reference bandwidth of the bus subsystem 30, 3.5 Gbps.

However, when the outstanding count of the first slave 40-1 is 0, the first blocking controller 31b allows the first master 20-1 whose bandwidth would be blocked because of exceeding the reference bandwidth to occupy the bus subsystem 30 between times t3 and t4.

Figure 20:
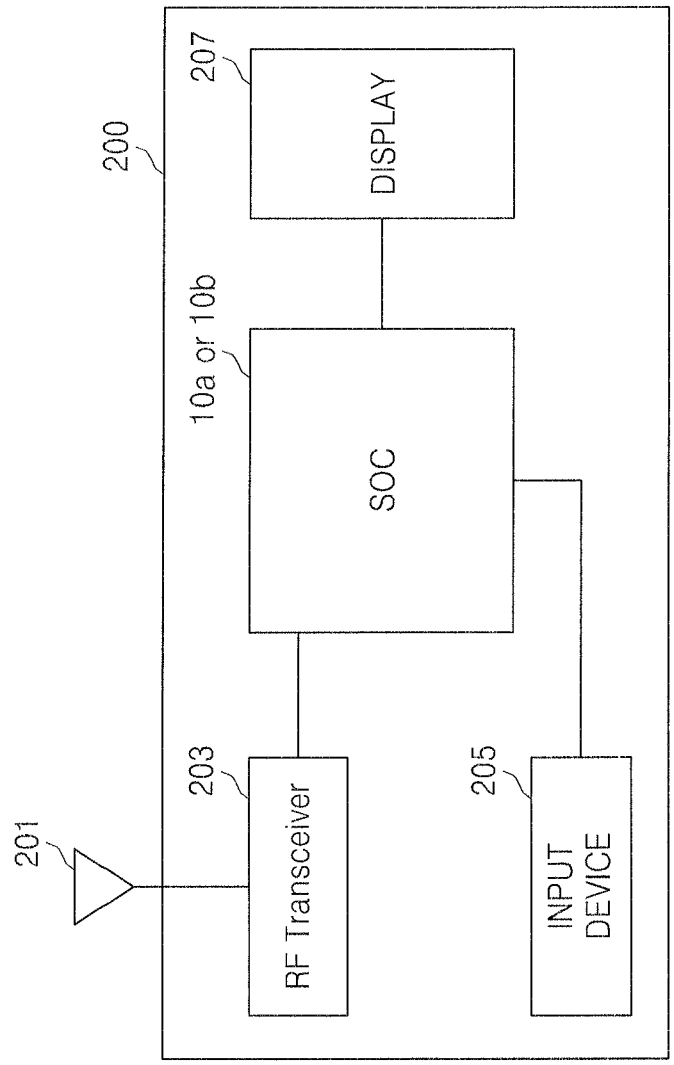
FIG. 20 is a block diagram of a computer system including the SoC of FIG. 1 or of FIG. 11.

FIG. 20 is block diagram of a computer system including the SoC illustrated in FIG. 1 or 11. Referring to FIG. 20, a computer system 200 includes the SoC 10a of FIG. 1 or the SoC 10b of FIG. 11, plus an antenna 201, a radio frequency (RF) transceiver 203, an input device 205 and a display 207.

The RF transceiver 203 may transmit or receive a radio frequency signal through the antenna 201. For example, the RF transceiver 203 may convert a radio frequency signal received through the antenna 201 into a signal which may be processed in the SoC 10a or 10b.

Accordingly, the SoC 10a or 10b may process a signal output from the RF transceiver 203 and transmit the processed signal to the display 207. Moreover, the RF transceiver 203 may convert a signal output from the SoC 10a or 10b into a radio frequency signal and output the converted radio signal to an external device through the antenna 201.

The input device 205 is a device which may be interacted with by a user and may then transmit a control signal for controlling an operation of the SoC 10a or 10b or transmit data to be processed by the SoC 10a or 10b, and may be implemented as a pointing device such as a touch pad and a computer mouse, a keypad or a keyboard.

Figure 21:
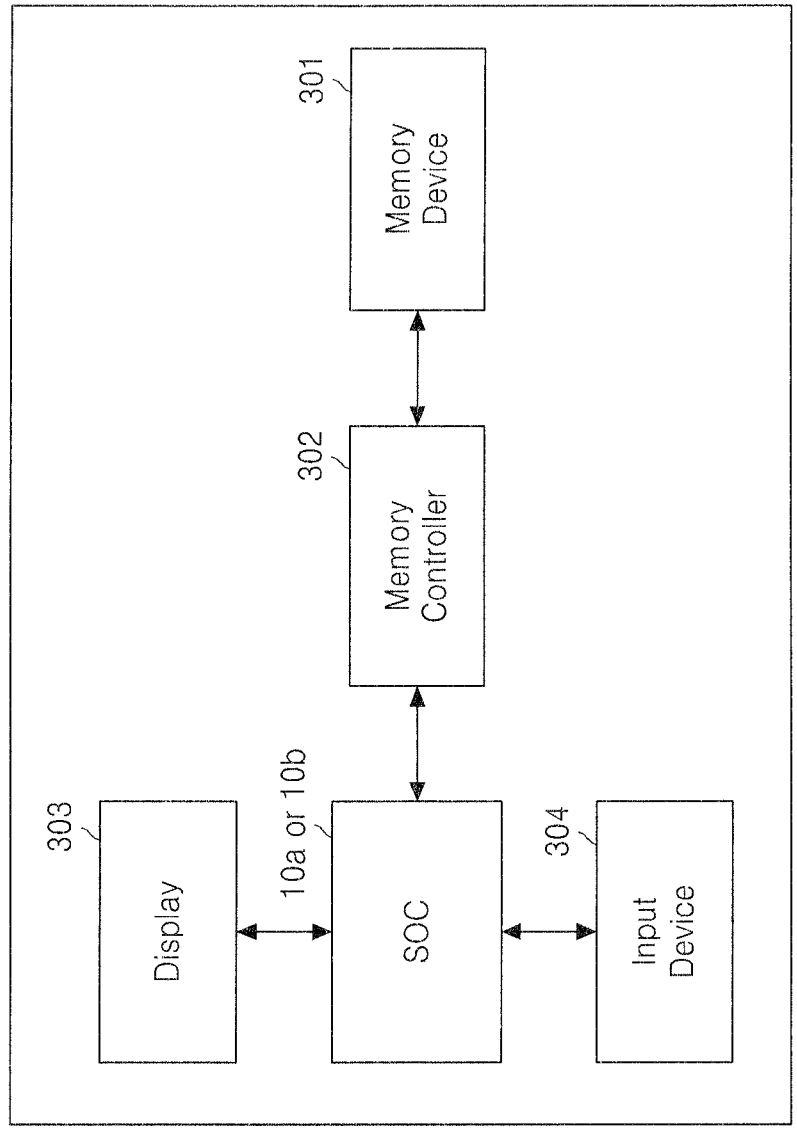
FIG. 21 is a block diagram of a computer system including the SoC of FIG. 1 or of FIG. 11.

FIG. 21 is another exemplary embodiment of s computer system including the SoC of FIG. 1 or of FIG. 11. Referring to FIG. 21, a computer system 300 including the SoC 10a or 10b of FIG. 1 or of FIG. 11 may be implemented as a personal computer (PC), a network server, a tablet PC, a net-book, an e-reader, a personal digital assistant (PDA), a portable multimedia player (PMP), a MP3 player or a MP4 player.

The computer system 300 includes the SoC 10a or 10b, a memory device 301, a memory controller 302 controlling a data processing operation of the memory device 301, a display 303 and an input device 304.

The SoC 10a or 10b may display data stored in the memory device 301 through the display 303 according to data input through the input device 304. For example, the input device 304 may be implemented as a pointing device such as a touch pad or a computer mouse, a keypad or keyboard. The SoC 10a or 10b may control the general operation of the computer system 300 and an operation of the memory controller 302.

The memory controller 302 which may control the operation of the memory device 301 may be embodied in a part of the SoC 10a or 10b or in a separate chip from the SoC 10a or 10b.

Figure 22:
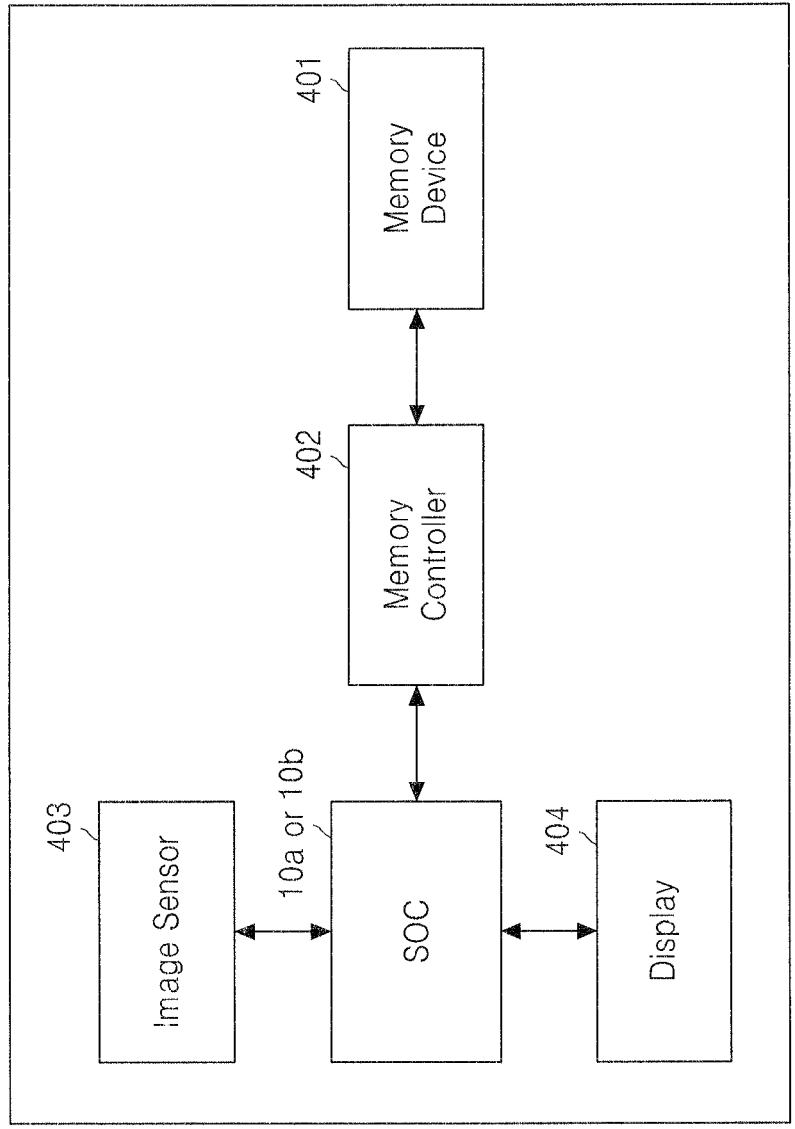
FIG. 22 is a block diagram of a computer system including the SoC of FIG. 1 or of FIG. 11.

FIG. 22 is still another exemplary embodiment of a computer system including the SoC of FIG. 1 or of FIG. 11. Referring to FIG. 22, a computer system 400 including the SoC 10a or 10b of FIG. 1 or of FIG. 11 may be embodied in an image process device, e.g., a digital camera or a digital camera-equipped mobile phone, or a smart phone.

The computer system 400 includes the SoC 10a or 10b, a memory device 401 and a memory controller 402 controlling a data processing operation of the memory device 401, e.g., a write operation or a read operation. In addition, the computer system 400 further includes an image sensor 403 and a display 404. The image sensor 403 of the computer system 400 converts an optical image into digital signals, and converted digital signals are transmitted to the SoC 10a or 10b or the memory controller 402. According to a control of the SoC 10a or 10b, the converted digital signals may be displayed through the display 404 or stored in the memory device 401 through the memory controller 402.

Moreover, data stored in the memory device 401 are displayed through the display 403 according to a control of the SoC 10a or 10b or of the memory controller 402. The memory controller 402 controlling an operation of the memory device 401 according to an exemplary embodiment may be embodied in a part of the SoC 10a or 10b or implemented as a separate chip from the SoC 10a or 10b.

Figure 23:
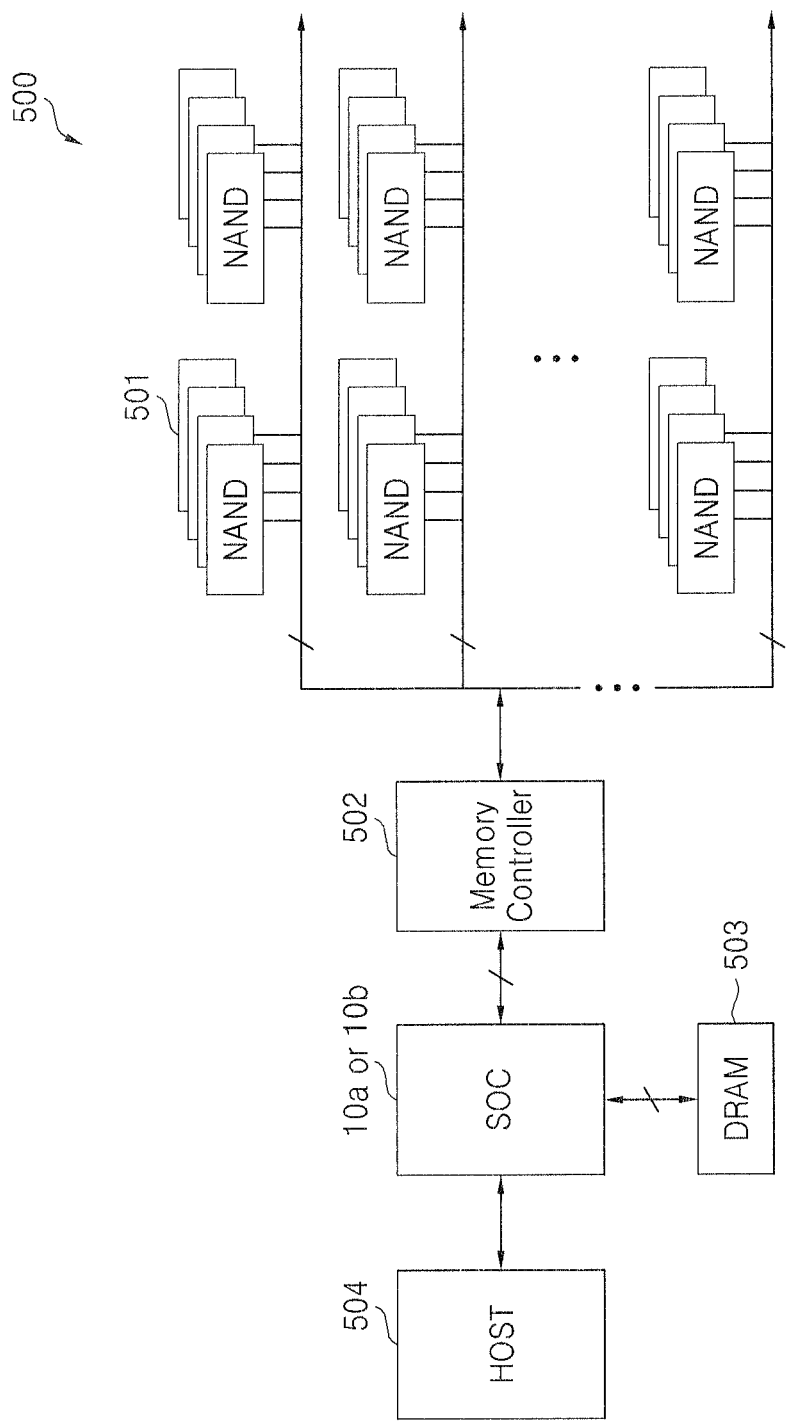
FIG. 23 is a block diagram of a computer system including the SoC of FIG. 1 or of FIG. 11.

FIG. 23 is still another exemplary embodiment of a computer system including the SoC of FIG. 1 or of FIG. 11. Referring to FIG. 23, a computer system 500 may be embodied in a data processing device like a solid state drive (SSD). The memory system 500 may include a plurality of memory devices 501, a memory controller 502 which may control each data processing operation of the plurality of memory devices 501, a volatile memory device 503 like a DRAM, and the SoC 10a or 10b which controls storage of data transmitted or received between the memory controller 502 and a host 504 in the volatile memory device 503.

When a specific master generates a data source inducing excessive traffic, the SoC of the present invention lowers the priority of the specific master or blocks the data source.

While exemplary embodiments have been particularly shown and described with reference to exemplary embodiments thereof, it will be understood by those of ordinary skill in the art that various changes in forms and details may be made therein without departing from the spirit and scope of exemplary embodiments as defined by the following claims.

What is claimed is:

1. A System on Chip (SoC) comprising:
a first master having a first bandwidth;
a first slave;
a bus switch configured to transmit a first command of the first master and to transmit a first response of the first slave, wherein the first response responds to the first command and has a first latency; and
a first priority controller connected between the first master and the bus switch, wherein the first priority controller measures at least one of the first bandwidth and the first latency based on the first command and the first response and adjusts the first priority of the first command according to at least one of the measurement result,
wherein the first command is a validity-indicating signal and the first response is a readiness-indicating signal.

2. The SoC of claim 1, further comprising:
a second master having a second bandwidth transmitting a second command to the first slave and receiving a second response to the second command from the first slave through the bus switch, wherein the second response corresponds to the second command and has a second latency; and
a second priority controller connected between the second master and the bus switch, wherein the second priority controller measures at least one of the second bandwidth and the second latency and adjusts the second priority of the second command according to at least one of the measurement results.

3. The SoC of claim 1, wherein the first priority controller comprises:
a bandwidth monitor measuring the first bandwidth; and
a priority generator adjusting the first priority by comparing the first bandwidth measured by the bandwidth monitor with a bandwidth reference value.

4. The SoC of claim 1, wherein the first priority controller comprises:
a latency monitor measuring the first latency; and
a priority generator adjusting the first priority by comparing the first latency measured by the latency monitor with a latency reference value.

5. The SoC of claim 3, wherein the first priority controller decreases the first priority when the measured first bandwidth is higher than the bandwidth reference value.

6. The SoC of claim 4, wherein the first priority controller decreases the first priority when the measured first latency is higher than the latency reference value.

7. The SoC of claim 1, further comprising a reset period controller setting the first priority as a default value at every reset period.

8. The SoC of claim 2, wherein the bus switch comprises:
a first slave-interface connected to the first master through the first priority controller;
a second slave-interface connected to the second master; and
a first master-interface connected to the first slave,
wherein each of the first slave-interface and the second slave-interface is connected to the first master-interface, and the first master-interface compares the first priority with the second priority and transmits one of the first command and the second command to the slave according to the comparison result.

9. The SoC of claim 2, wherein the second priority controller comprises:
a bandwidth monitor measuring the second bandwidth; and
a priority generator adjusting the second priority by comparing second bandwidth measured by the bandwidth monitor with a bandwidth reference value,
wherein the second priority controller decreases the second priority when the measured second bandwidth is higher than the bandwidth reference value.

10. The SoC of claim 2, wherein the second priority controller comprises:
a latency monitor measuring the second latency; and
a priority generator adjusting the second priority by comparing second latency measured by the latency monitor with a latency reference value,
wherein the second priority controller decreases the second priority when the measured second latency is higher than the latency reference value.

11. A system on chip (SoC) comprising:
a master having a first bandwidth
a slave; and
a bus subsystem transmitting a command of the master and a response of the slave to the command,
wherein the bus subsystem measures the first bandwidth based on the command and the response, and
wherein the bus subsystem blocks transmission of the command based on the first bandwidth measurement result and upon an operation status value of the slave,
wherein the first command is a validity-indicating signal and the first response is a readiness-indicating signal.

12. The SoC of claim 11, wherein the bus subsystem comprises:
a blocking controller configured to block or release transmission of the first command;
a bus switch connected between the blocking controller and the slave, configured to transmit the command to the slave and to transmit the response to the master; and
a blocking monitor connected between the bus switch and the slave and configured to transmit the operation status value to the blocking controller.

13. The SoC of claim 12, wherein the blocking controller comprises:
a bandwidth monitor measuring the first bandwidth; and
a combination circuit configured to block transmission of the command if measured first bandwidth is higher than a bandwidth reference value and to block transmission of the command while the operation status value is higher than an operation status reference value.

14. The SoC of claim 13, wherein, after transmission of the command is blocked, the blocking controller transmits the blocked command when the operation status value is smaller than the operation status reference value.

15. The SoC of claim 11, wherein the operation status value comprises an outstanding count of the slave, and
wherein the outstanding count increases when each command is received by the slave, and
wherein the outstanding count decreases when each response is transmitted by the slave.

16. An operation method of a system on chip (SoC) comprising:
measuring at least one of a first bandwidth and first latency measured by detecting a result of handshaking between a first master and a slave, wherein the handshaking is performed through a first priority controller and through a bus switch; and
adjusting the first priority of a command output from the first master according to the first bandwidth measurement result,
wherein the handshaking includes the first master and the slave, in preparing for transmitting data to each other, the first master transmits a validity-indicating signal to the slave and the slave transmits a readiness-indicating signal to the first master.

17. The operation method of claim 16, further comprising:
measuring at least one of a second bandwidth and a second latency measured by detecting a result of handshaking between a second master and the slave, wherein the handshaking is performed through a second priority controller and the bus switch; and adjusting a second priority of a command output from the second master according to one of the measurement results.

18. The operation method of claim 16, further comprising decreasing the first priority when the at least one of the measurement results is higher than at least a corresponding reference value.

19. The operation method of claim 16, further comprising setting the first priority as a default value at every reset period.

* * * * *